(12) United States Patent
Ivchenko et al.

(10) Patent No.: US 7,007,107 B1
(45) Date of Patent: Feb. 28, 2006

(54) METHODS AND APPARATUS FOR PERFORMING DATA ACQUISITION AND CONTROL

(75) Inventors: Olexiy Ivchenko, Watertown, MA (US); Denys L. Kraplin, Holliston, MA (US)

(73) Assignee: United Electronic Industries, Watertown, MA (US)

( * ) Notice: Subject to any disclaimer, the term of this patent is extended or adjusted under 35 U.S.C. 154(b) by 747 days.

(21) Appl. No.: 10/187,186

(22) Filed: Jul. 1, 2002

Related U.S. Application Data

(60) Provisional application No. 60/336,464, filed on Oct. 22, 2001.

(51) Int. Cl.
*G06F 15/16* (2006.01)
(52) U.S. Cl. .................................... 709/250
(58) Field of Classification Search ............... 709/250
See application file for complete search history.

(56) References Cited

U.S. PATENT DOCUMENTS 5,878,033 A * 3/1999 Mouly ........................ 370/312
5,966,166 A * 10/1999 Coutinho et al. ........... 348/14.1
6,236,855 B1 * 5/2001 Austin ........................ 455/423
6,487,457 B1 * 11/2002 Hull et al. ..................... 700/17
6,757,522 B1 * 6/2004 Naegeli et al. ........... 455/67.11

* cited by examiner

*Primary Examiner*—David Y. Eng

(74) *Attorney, Agent, or Firm*—Chapin & Huang, L.L.C.; Barry W. Chapin, Esq.

(57) ABSTRACT

Mechanisms and techniques provide a data acquisition basic input output system between a central controller and a set of modules networked to the central controller. The central controller obtains at least one command to be sent to at least one module of the set of modules networked to the central controller and composing a request message containing the command. The request message has an associated timing pattern selected from a plurality of available timing patterns, such as a fixed timing pattern or a variable timing pattern. The central controller transmits the request message to the module(s) according to the associated timing pattern and receives, according to the associated timing pattern, a response message from the module(s). The data acquisition basic input output system communications do not require reliance on transport layer protocols or collision avoidance techniques.

33 Claims, 8 Drawing Sheets

METHODS AND APPARATUS FOR PERFORMING DATA ACQUISITION AND CONTROL

PRIORITY TO RELATED PROVISIONAL APPLICATION

This application claims the benefit of the filing date of formerly filed U.S. Provisional Application for Patent having U.S. Ser. No. 60/336,464 filed Oct. 22, 2001 entitled "Methods and Apparatus for Controlling Signals" which is assigned to the same Assignee as the present invention and which shares co-inventorship with the present invention. The entire teachings and contents of this referenced Provisional Application for Patent are hereby incorporated by reference herein in their entirety.

BACKGROUND OF THE INVENTION

Conventional automation control and data acquisition systems typically include one or more sensing or control devices that are capable of controlling or obtaining signal measurements from equipment to which they are connected. The sensing and control devices operate under the control of one or more processing units. As an example, a conventional automated data acquisition and control system can be used to control the precise operation of machinery such as that used in the process of semiconductor fabrication.

Continuing the example of fabricating semiconductor devices, such a process involves accurately controlling a complex arrangement of heating and cooling machinery, semiconductor wafer conveyance systems and chemical vapor deposition system hardware (valves, gas and pressure measurement devices, thermocouples, and the like). Each element of the semiconductor fabrication system (i.e., each temperature sensing device, valve, mechanical manipulator, pressure sensor, thermocouple, etc.) can include an attached sensing and/or control device that is capable reading and writing data (e.g., analog and/or digital control signals) to and from that element. The control devices are coupled to a central processing unit that orchestrates their operation in a prescribed sequence. The central processing unit thus precisely controls the operation of the various elements in the system to allow the elements to work together in a prescribed manner for fabrication of semiconductor devices. Semiconductor fabrication is only one example of a typical use for an automation control and data acquisition system.

Within a conventional data acquisition system, the processing units are typically coupled to the sensing and control devices by standardized networking cables such as category-five (CAT 5) networking cables or other wires, lines, data links or the like. In such systems, the central processing unit exchanges data with the sensing and control devices using a standardized network protocol such as the Transmission Control Protocol (TCP) and Internet Protocol (IP) or TCP/IP. TCP/IP provides a reliable mechanism to exchange packets of data between the processing unit and control devices without having to worry about loss of data packets or networking transmission errors.

Typical conventional data acquisition systems can operate the TCP/IP protocol over an Ethernet network medium that utilizes, for example, standard 100-Base-T Ethernet hardware controllers within the communication ports of the central processing unit and the sensing and control devices. Such standardized Ethernet hardware operates a carrier sense multiple access with collision detection (CSMA/CD) protocol in order to detect packet transmission collisions within the network medium between devices. Using this protocol, when a network device is transmitting onto network medium, the Ethernet hardware continues to listen to the network. If another node tries to transmit at the same time, then the CSMA hardware detects a collision. The CSMA hardware then considers both transmissions from both network nodes to be corrupted and this protocol deletes any data received by recipient devices from the receiving queue that stores incoming packets. After collision detection, both network nodes wait a random period of time before attempting to again retransmit the same packets. Thus, CSMA/CD is stochastic in its nature. In addition, this protocol avoids upper layer protocols such as TCP/IP from having to be concerned with situations in which two or more devices attempt to transmit onto a network medium at one time. Other conventional protocols such as carrier sense multiple access with collision avoidance (CSMA/CA) operate in a similar manner but decrease the number of potential collisions.

SUMMARY OF THE INVENTION

Conventional techniques for controlling the transmission of messages in data acquisition and control systems that utilize conventional networking technologies such as TCP/IP and CSMA/CD or CSMA/CA suffer from a variety of deficiencies. In particular, in many data acquisition or automation control system applications, there may be a real-time requirement for the acquisition of data and/or for the precise control of an element in the system in precise time constraints. Since conventional systems rely on TCP/IP and CSMA/CD or CSMA/CA protocol communications to perform the exchange of messages between, for example, a central controller and devices within the data acquisition system, it can be difficult to achieve true or hard real-time communications (i.e., the fastest performance) due to overhead constraints imposed by TCP/IP and CSMA/CD or CSMA/CA. In addition, conventional data acquisition systems that utilize standard data communications protocols use and CSMA/CD or CSMA/CA protocols within their Ethernet hardware that is not designed for hard-real-time performance. This is due in part, as noted above, to the network arbitration performed in order to perform collision avoidance or collision detection using CSMA/CD or CSMA/CA. True or hard real-time response is possible only when there are no collisions on the network and since these protocols use a random wait strategy to re-transmit packets in the event of collisions, the performance of collection of data in real-time is limited. Accordingly, conventional data communications protocols used to perform data acquisition and control suffer from underlying communications flaws built-in to standardized networking protocols.

As a specific example, during the process of performing semiconductor fabrication, an automation control system may require the ability to precisely control opening and closing of one or more valves in a certain prescribed order and under precise time constraints (e.g., action in system taken as soon as possible after deciding action is required) so as to able to accurately control, for example, deposition of a chemical vapor as a molecular layer onto a semiconductor substrate material. A conventional automation control system operating such equipment may use feedback from pressure or temperature sensors in order to determine when valves are to be opened or closed. For instance, the automation control system may continually read a pressure sensor coupled to a gas chamber and may require that a valve providing the gaseous vapor be closed as quickly as possible when the gas vapor pressure in a chamber deposition area reaches a predetermined threshold. Conventional data acquisition (e.g., pressure sensing) and automation control systems (e.g., to control valve operation) that utilize TCP/IP and/or and CSMA/CD or CSMA/CA data communications techniques for receiving communications signals regarding sensing temperature and/or pressure and in response, for sending signals to manipulate a valve assembly, can be limited in their ability to precisely control, in real-time, the precise sensing and subsequent valve operations.

This is due in part to the fact that processing cycles are required to perform TCP/IP data communications processing during the exchange of messages between a central processing system and one or more sensing and/or control devices. The processing overhead associated with TCP/IP and CSMA/CD or CSMA/CA communications can impose a significant burden on real-time operational requirements of the central processing unit as well as on each sensing and control device. This burden can result in non-real-time (referred to herein as soft real-time) actual performance when true real-time (or hard-real time) performance is actually required for optimal outcomes.

As another example, certain laboratory experiments on animals may include a requirement to send and receive analog or digital signals extremely rapidly to and from a transducer probing device. Medical experiments performed using living mice may include disposing a small needle-like probe into or nearby active brain tissue of a living mouse. The end of the probe may include numerous emitters and receivers of analog and/or digital electrical signals each with a coupling to data acquisition sensing and stimulus elements. These transducer control elements may in turn be coupled via a network to a central processing unit or controller located elsewhere in a laboratory setting. The central processing unit can provide stimulation of (i.e., output to) the emitters of the probe by sending signal commands to the sensing elements for conversion into, for example, analog signals to be transmitted to the tip of the probe to stimulate the brain of the mouse. Likewise, receivers disposed on the probe can actively sense electrical reactions occurring within the brain of the mouse that are detected and accumulated in the sensing element as response data. The central processing unit can send signaling commands to the sensing element in order to actively read the electrical stimuli sensed by the probe within the brain of the mouse.

Since requirements for such experiments include a real-time (i.e., the fastest possible) capability to interact with the probe, data acquisition systems that rely on conventional network protocols and technology may not be capable of producing required response times. Accordingly, conventional data acquisition systems that rely on TCP/IP and CSMA/CD or CSMA/CA communications for the transmission of signaling commands to and from the sensing and receiving elements in such medical experiments can fail to provide adequate transmission rates for the real-time detection of certain conditions occurring within the mouse's brain. This is due in large part to the overhead required for performing TCP/IP and conventional network processing (e.g., CSMA/CD or CSMA/CA processing) required for transporting the signaling commands between the processing unit and the sensing and receiving elements.

In addition, conventional data acquisition and control systems are relatively inflexible in that they implement signal timing techniques within the application layer. In other words, any timing control of commands and responses, if provided at all in such systems, is dealt with in the data acquisition and control application itself, rather than at the network level. As such, due to the limitations noted above, it becomes difficult using conventional systems to provide variations in timing patterns used to send and receive commands between a central processing unit and one or more signaling elements according to different timing patterns while still achieving true or hard real time performance in a data acquisition and control system.

To illustrate this point, if a CSMA/CD or CSMA/CA network arbitration algorithm happens to determine that the network medium is currently being used for communication between, for example, the processing unit and another sensing element, a sensing element that requires immediate (i.e., real-time or the fastest possible) transmission of a signaling command back to the central processing unit will have to wait a predetermined or random amount of time before again attempting to transmit the packet of information back to the central processing unit. This is because the control or data acquisition application does not control when an actual packet of data is transmitted onto the network. Rather, the packet is passed from this application down to a conventional layered networking system including transport, network, data link and physical layers which are then responsible for transporting the packet as fast as they are able to do so (using conventional techniques) between a source and destination over the network. However, since such conventional networking capabilities do not provide for true real time communications, the wait or delay that may be incurred, for example in establishing a TCP connection or in negotiation arbitration of the network medium in the event of a collision can have a significant impact on the ability to perform real-time communications between the application and a sensing or control device.

Embodiments of the present invention significantly overcome these and other deficiencies found in conventional data acquisition and control systems. In particular, embodiments of the invention provide mechanisms and techniques that operate within a data acquisition and control system to provide a communications protocol between a central controller and a set of modules networked to the central controller that are used for controlling device within the data acquisition and control system. As an example of such a system, a central controller can be networked to a set of modules and each module can be responsible for controlling one or more sensing or control device (e.g., laboratory devices, probes, valves, machinery, sensors, etc.). Using the techniques explained herein, the central controller sends and receives commands and data to and from the modules. A user operating a data acquisition or control application (e.g., a software program) within the central controller can configure such an application to provide a list of commands (referred to herein as a channel list of commands) to be sent to and executed by the modules networked to the central controller. As an example, a channel list command sent from the central controller to a particular module networked to the central controller may instruct that module to output certain analog or digital signals to a device coupled to that module and may further instruct the module to read certain signals from that device and return the data read in one or more response messages.

Once the channel list is configured with the appropriate commands to "exercise" (i.e., send data to and receive data from) the modules, embodiments of the invention operating in both the central controller and the modules operate to provide efficient and flexible communications (i.e., the transport of request and response messages) between the central controller and the modules. Embodiments of the invention are referred to herein as a Data Acquisition-Basic Input Output System or "DAQ-BIOS".

According to various embodiments of the DAQ-BIOS of the present invention, the system allows communication between a central controller and a number of modules using different timing patterns depending upon the purpose or application of the data acquisition or control system. For example, according to one embodiment of the invention, the DAQ-BIOS operating in the central controller can utilize a fixed timing pattern in order to send one or more commands to one or more modules in sequence, one module at a time. Upon receipt of a request message containing a command by a module to which that request message is addressed, the module can immediately process the command and can return a response message back to the central controller. Then, at the next time slot for the next module in the fixed timing pattern, the DAQ-BIOS can repeat the process and can proceed to communicate with the next module in the sequence (as defined by the channel list of commands). In this manner, a fixed timing pattern provides respective time slots for each module during which the central controller can create and transmit respective request messages containing at least one command to a particular module and can receive a response message from that module. After the time slot for one module is complete, the central controller can continue performing commands defined within the channel list in order to communicate with other modules either in the fixed or a variable timing pattern (explained below).

According to another embodiment of the invention, the DAQ-BIOS operating in the central controller can utilize a variable timing pattern in order to send one or more commands in a single (e.g., bundled) request message to a plurality of the modules networked to central controller in a multicast or broadcast fashion. Each command set for each different module in a single request message can indicate, for example, a time at which that particular module is to respond to the command(s) within the request message directed to that particular module. In addition, the request message can indicate an amount of data that each module is to return in one or more response messages in response to processing the command(s) for that module. In this manner, the variable timing pattern allows embodiments of the invention, for example, to provide a command or commands to one module that may cause that module to produce a response message at a particular defined time with, for example, a large amount of response data, whereas other commands in the same request message are designated for processing by a different module and cause this other module to respond at a different time with a lesser amount of data. The variable timing pattern thus allows a wide variety of scenarios to be created which allow data acquisition and control from different modules networked to the central controller according to different needs or requirements concerning time of response and amount of data received.

In addition, embodiments of the invention can provide true or hard real time response (i.e., can acquire data from and control modules in a real-time manner, as quick as possible) with or without the use of conventional transport and network layer protocols such as TCP/IP and without collision detection and avoidance mechanisms such as those found in CSMA/CA or CSMA/CD. In particular, in one embodiment of the DAQ-BIOS system of the invention does not require TCP/IP. In this embodiment, data acquisition and control is performed in true or hard real time by encapsulating request and response messages containing channel list module commands (or data produced in response to processing such commands within one or more modules) using only Ethernet frames and link layer data communications. By avoiding the use of transport and network layer protocols, DAQ-BIOS provides its own timing patterns and network arbitration techniques as explained herein in order to avoid collisions of messages transmitted over the network between the central controller and the modules. As such, not only do these embodiments of the invention do away with the requirement to utilize cumbersome and time-consuming transport layer protocols such as TCP/IP, but since these embodiments of the invention provide network control on their own, including timing patterns that govern when the network is to be used for transmission of messages by either the central controller or specific modules, the performance of a data acquisition system configured with embodiments of the invention can significantly exceed that of conventional data acquisition and control systems with respect to amounts of time required to collect and process data in a real-time manner.

By way of example, using fast Ethernet 100 Mbps link layer networking technology, one embodiment of the invention can use either a fixed or variable timing pattern without the use of conventional TCP/IP or collision avoidance mechanisms. The central controller can thus encapsulate request messages sent to modules and response messages received from modules in Ethernet frames without requiring the use of TCP/IP connection establishment mechanisms or network arbitration schemes such as CSMA/CA or CSMA/CD. Accordingly, since embodiments of the invention provide complete control over when messages are sent and received by the central controller and the modules, signaling to and from modules can take full advantage of the 100 Mbps throughput of a fast Ethernet network without incurring the overhead associated with complex TCP/IP connection establishment messages (e.g., TCP SYN, SYN ACK and SYN ACK ACK sequences) and complex error correction and retransmission scenarios (e.g., CSMA/CA or CSMA/CD) since collision avoidance is handled by the DAQ-BIOS system of the invention.

Other embodiments of the invention allow the operation of DAQ-BIOS over networks such as conventional Ethernet networks (e.g., the Internet or a dedicated or non-dedicated Local Area Network) that use TCP/IP, without effecting the operation of the TCP/IP protocol stack. That is, DAQ-BIOS as explained herein can operate over conventional networks, but due to overhead processing requirements associated with TCP/IP, there may be no guarantee of hard real-time response. Accordingly, the processing techniques explained herein to send and receive request and response message between the central controller and the modules according to fixed or variable timing patterns can operate over standard networking protocols without effecting their operation. In such cases, the DAQ-BIOS in the central controller and the modules communicates as an application to the TCP/IP layers, as any application that needs to send or receive data over a network. There may or may not be other devices besides modules and the central controller on such a network. However, due to the processing associated with TCP/IP and the potential for collisions of data packets, embodiments that operate in this manner do not guarantee hard (i.e., the fastest) real-time response. Such embodiments are useful however, when a separate dedicated network medium is unavailable or when modules and the central controller may be separated in distance so as to require networking equipment such as switches and/or routers to propagate communications between the central controller and/or the modules.

More specifically, certain embodiments of the invention operate in a central controller and provide a method for performing acquisition of data from a set of modules networked to the central controller. One such method comprises the steps of obtaining at least one command to be sent to at least one module of the set of modules networked to the central controller. The method them composes a request message containing the command(s). The request message has an associated timing pattern selected from a plurality of available timing patterns. Timing patterns can include a fixed timing pattern that shares request and response time between each module during a request response sequence in a time sliced manner or a variable timing pattern that provides a request message to modules that indicates when those modules are to respond to the request message and that indicates an amount of return data to be returned from each module in a response message from that module. The method then transmits the request message to the module(s) of the set of modules according to the associated timing pattern and receives, according to the associated timing pattern, a response message from the module(s) of the set of modules.

In another embodiment, the associated timing pattern is a variable timing pattern and the step of composing a request message comprises the steps of determining a response time for the at least one command. The response time defines when a module to which the command is directed is to respond to the command. The method also selects an amount of return data to be returned in a response message from the module to which the command is directed and assigns the response time and the amount of return data to the command in the request message. Accordingly, the step of receiving a response message receives the response message from the module to which the command is directed at a receipt time related to the response time. The response message contains data no greater than the amount of return data assigned to the command.

In another embodiment, the step of obtaining at least one command comprises the step of obtaining at least one respective command for a plurality of respective modules in the set of modules. The step of determining a response time for the command comprises the step of determining a respective response time associated with each respective module. Each respective response time indicates when the module to which that response time is associated is to respond after processing the command obtained for that module. Also, the step of selecting an amount of return data comprises the step of determining a respective amount of return data to be returned from each respective module in response to processing the command and the step of composing a request message comprises the steps of combining the command, the respective response time and the respective amount of return data for each of the respective modules into the request message. Furthermore, the step of transmitting the request message transmits the request message containing at least one respective command for multiple respective modules from the set of modules networked to the central controller.

In another embodiment, the step of combining the command for the plurality of respective modules sequentially inserting each command associated with a respective module into a data portion of the request message. The method then inserts a module offset into the data portion. The module offset indicates where in the data portion of the request message the command for a respective module begins in the data portion. This embodiment repeats the steps of sequentially inserting each command and inserting a module offset until all commands for each respective module are inserted into the data portion of the request message and module offsets are inserted into the data portion indicating where a command begins for a particular module of the plurality of modules.

Another embodiment repeats the step of receiving a response message in order to receive a response message from each module for which at least one respective command was obtained and was combined in the request message. As such, using a single request message, responses from many modules may be obtained, with each module responding at is designated response time and with its designated amount of return data.

A further embodiment repeats the steps of obtaining, composing, transmitting and receiving for a plurality of different modules in the set of modules networked to the central controller such that each repeated step of transmitting transmits a single request message containing commands for different modules, and such that each repeated step of receiving receives a response message from each of the different modules for which the transmitted request message contained at least one command. This forms a bundled request message and for each one, each module responds with a predetermined amount of data at a predetermined response time. Since the response time is selected by the DAQ-BIOS in the central controller, there is no need to use error correction protocols such as those employed in TCP/IP nor is there a need to do collision avoidance such as provided in conventional CSMA/CA or CSMA/CD protocols. This allows the DAQ-BIOS to do all packet scheduling on the network and thus more of the total available bandwidth is useable for transfer of data between the central controller and the modules. Performance is thus significantly increased over conventional data acquisition and control systems.

In another embodiment, the step of receiving comprises the steps of detecting that the response message indicates that additional data is available from a responding module that originated the response message. The method transmits a second request message to the responding module. The second request message contains at least one command to retrieve the additional data from the responding module. The method also receives a second response message from the responding module. The second response message contains the additional data from the responding module. This can also be repeated until all data is obtained from a module using request and response messages. The module can indicate when more data, or no more data, is available via a flag or other indicator in a response message.

In yet another embodiment, the step of receiving further comprises the step of repeating the steps of detecting, transmitting a second request message and receiving a second response message until the step of detecting indicates that no more additional data is available from the responding module. In this manner, multiple response messages can be obtained from a module to obtain all data available.

In a further embodiment, the associated timing pattern is a fixed timing pattern and the step of obtaining a command comprises the step of obtaining a command for a single module of the set of modules networked to the central controller. The step of transmitting the request message comprises the step of transmitting the request message containing the command to the single module during a time slot assigned to that single module and the step of receiving a response message comprises the step of receiving a response message from the single module during a response time slot assigned to that single module. In this manner, requests and responses are received module by module.

One embodiment repeats the steps of obtaining, composing, transmitting and receiving for a sequence of different modules in the set of modules networked to the central controller. As such, in response to each repeated step of transmitting, each of the different modules in the sequence receives a request message containing the command(s) for that module and each module processes the command(s) and responds during a time slot assigned to that module.

In another embodiment, a transmit time between repeated steps of transmitting a request message is greater than a response time between successive steps of transmitting and receiving a response message for a single module. As such, each module to which a request message is transmitted is capable of providing a complete response message during a time slot assigned to that module prior to a next step of transmitting.

In another embodiment, one of the repeated steps of receiving a response message comprises the step of detecting a network error in one of the repeated steps of transmitting and receiving. This method embodiment also comprises the step of, waiting, in response to the step of detecting a network error, for a delay time slot to expire after performing the step of transmitting to a last module in the sequence of different modules before repeating the steps of obtaining, composing, transmitting and receiving. In this manner a response message can be received from a module affected by the network error.

In another embodiment, the step of obtaining at least one command comprises the steps of accessing a channel list to obtain the command. The channel list defines a set of commands to be processed by modules of the set of modules networked to the central controller. Each command in the set of commands identifies an associated destination module and defines an associated operation to be performed by the destination module.

In another embodiment, the associated operation defined by at least one command is a read operation to acquire data from the destination module associated with that command. The data read can be, for example, data from a device that the module is continually collecting. In a further embodiment, the associated operation defined by at least one command is a write operation and the command defines data to be written to the destination modules associated with that command. This allows data to be provided to modules, for example, for output to devices. The data can be, for example, signal data or signal levels (e.g., analog or digital signaling data) to be sent to devices coupled to the modules.

The method embodiments can further comprise the step of processing the response message to acquire data related to at least one module. In this manner, the central controller can continually request data from modules and the modules can respond. Since this is done using network control provided by the DAQ-BIOS, instead of conventional protocols such as TCP/IP, performance is greatly increased. Also, since commands are obtained form a channel list, the channel list allows the ability to setup a "program" of sorts with which to exercise the modules. By arranging the commands in a channel list and by using appropriate timing patterns for the commands, a wide variety of techniques can be used to send and receive data to and from modules and the central controller as may be required. This provides great flexibility in developing data acquisition systems that have unique requirements for obtaining data in different manners from different devices (coupled via modules to the central controller). Since the timing patterns provide collision avoidance and do not require the overhead of TCP connection establishment, speed is also greatly enhanced as compared to conventional systems.

In one embodiment, the step of processing the response message comprises the steps of obtaining response data from the response message produced as a result of the module(s) processing the command(s) in the request message transmitted to that module. The method also provides the response data to either or both of a user extension routine that is capable of processing the response data and/or shared memory that is capable of storing the response data.

In one embodiment, the associated timing pattern is a variable timing pattern and the step of composing a request message composes a request message containing at least one command applicable to multiple modules in the set of modules. Furthermore, the step of transmitting transmits the request message to a multicast address such that each module equipped to receive request messages at the multicast address receives the request message and processes the at least one command contained therein.

In another embodiment, the step of transmitting the request message comprises the steps of creating an Ethernet packet containing the request message and transmitting the Ethernet packet onto a network coupling the central controller and the modules using a non-connection oriented data communications protocol. Thus TCP/IP is not needed.

In another embodiment, the network coupling the central controller and the modules is a dedicated network and the step of transmitting the Ethernet packet onto the network comprises the step of interfacing directly with a link layer to transmit the Ethernet packet onto the network such modules that receive the Ethernet packet do not require operation of a connection oriented protocol.

In another embodiment, a module networked to the central controller is coupled to a device from which that module acquires data, and the command transmitted in the request message to the module includes a command to acquire data from the module. The method further comprises the step of repeating the steps of obtaining, composing, transmitting and receiving such that response messages received from modules networked to the central controller return data in real time to the central controller in response to module processing the command.

In a further embodiment, message data can be handled from modules by a user extension routine at the central controller. The central controller (i.e., the DAQ-BIOS) determines if the response message is associated with a user extension routine, and if so, passes response data contained in the response message to the user extension routine, and if not, passes the response data to shared memory. In this manner, the central controller can route message data to either shared memeory for use by an application, or to user extension routines.

Other embodiments of the invention are directed to the modules networked to the central controller. One such embodiment operates in a module networked to a central controller and provides a method for providing data acquisition to the central controller. The method comprises the steps of receiving, a request message containing at least one command. The request message indicates a timing pattern selected by the central controller. As an example, the request message may indicate a fixed or variable timing pattern. The method obtains the command(s) from the request message and processes the at command(s) in the module. The method then transmits a response message to the central controller in response to processing the command(s). The response message is transmitted according to the timing pattern specified by the request message.

In a related embodiment, the timing pattern selected by the central controller is a variable timing pattern and the step of receiving comprises the steps of interfacing directly with a link layer in the module to receive an Ethernet packet from the network such that the module does not require operation of a connection oriented protocol (e.g., does not require TCP/IP).

In another module embodiment, the timing pattern selected by the central controller is a variable timing pattern and the step of obtaining comprises the steps of obtains a module offset from a data portion of the request message. The method then traverses command sets in the request message using the offset to locate a command set associated with the module that received the request message. In this manner, when the central controller uses a variable timing pattern to send a bundled request message to the module, the module can figure out what commands in the request message are to be processed by this module from different command sets for different modules in that request message. A multicast address may be used to send such a bundled request message to the modules.

In yet another embodiment, the step of processing the command comprises the steps of processing the command(s) in the module using any input data specified in the command and retrieving any output data to be returned to the central controller from the module for the command. The method also places the output data into a response message up to an amount of data assigned for the module as specified within the request message. In this manner, DAQ-BIOS places as much data as will fit in a return packet for return to the central controller.

In a further embodiment, the step of processing the at least one command further comprises the steps of determining if additional data is available for return to the central controller that cannot fit into the response message. If such additional data is available, the DAQ-BIOS sets an additional data flag to true in the response message. This can indicate to the central controller that the module has more data available and the central controller can consider sending additional request messages to module(s) that respond as having more data available. This may be done, for example, after completion of a response frame (i.e., after completion of a frame in the timing pattern selected. In the case of a fixed timing pattern, before querying the next module, multiple request messages (followed by response messages) can be used to query the same module to "extract" or otherwise obtain all data available at that time (i.e., when that module indicates more data is available). This can continue until the module indicates no more data is available.

Other embodiments of the invention include a computer system, such as a data communications device, computerized device, central controller, module, or other device configured with software and/or circuitry to process and perform all of the method operations noted above and disclosed herein as embodiments of the invention. In such embodiments, the device, such as a data communications device (e.g., a module or a central controller in a data acquisition and/or control system) comprises a communications interface (e.g., a network interface), a memory (e.g., any type of computer readable medium, storage or memory system), a processor and an interconnection mechanism connecting the communications interface, the processor and the memory. In such embodiments, the memory system is encoded with a DAQ-BIOS application that when performed on the processor, produces a DAQ-BIOS process that causes the computer system to perform any and/or all of the method embodiments, steps and operations explained herein as embodiments of the invention. In other words, a central controller computer system, module, or other device that is programmed or otherwise configured to operate DAQ-BIOS techniques as explained herein is considered an embodiment of the invention.

Other arrangements of embodiments of the invention that are disclosed herein include software programs to perform the DAQ-BIOS operations summarized above and disclosed in detail below. As an example, a DAQ-BIOS software control application, that exists on a computer readable medium such as a disk that can be loaded into a central controller or a module is considered an embodiment of the invention. More particularly, a computer program product is disclosed which has a computer-readable medium including computer program logic encoded thereon that, when executed on at least one processor with a computerized device (e.g., within a module or a central controller), causes the processor to perform the DAQ-BIOS operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or within other a medium such as within firmware, a microchip or as microcode in one or more ROM or RAM or PROM or FPGA chips or as an Application Specific Integrated Circuit (ASIC). These software or firmware or other such DAQ-BIOS configurations can be installed onto a computer system, central controller, module, data communications device or other such device to cause such a device to perform the techniques explained herein as embodiments of the invention.

It is to be understood that the system of the invention can be embodied strictly as a software program, as software and hardware, or as hardware or circuitry or as a processor (e.g., an ASIC or FPGA programmed to perform DAQ-BIOS operations). The features of the invention, as explained herein, may be employed in devices and software systems such as those manufactured by United Electronic Industries of Canton, Mass.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the present invention provide mechanisms and techniques that operate within a data acquisition and control system to provide a communications protocol between a central controller and a set of modules networked to the central controller that are used for controlling device within the data acquisition and control system. The DAQ-BIOS communications mechanisms and techniques explained herein allow hard real-time acquisition of data, or control of devices, according to different timing patterns thus providing flexibility in the use of the data acquisition and control system to acquire data and control devices in a variety of different situations. In addition, certain embodiments of the invention provide communications between a central controller and a set of modules networked to the central controller without the use of conventional transport layer protocols (e.g., TCP/IP) and without associated connection establishment techniques and error correction mechanisms (e.g., without CSMA/CA or CSMA/CD). It is to be understood however that other embodiments of the invention can operate DAQ-BIOS between a central controller and modules over a network that does use TCP/IP or similar network and transport layer protocols. Is such other embodiments however, there is no assurance of hard real-time response.

Figure 1:
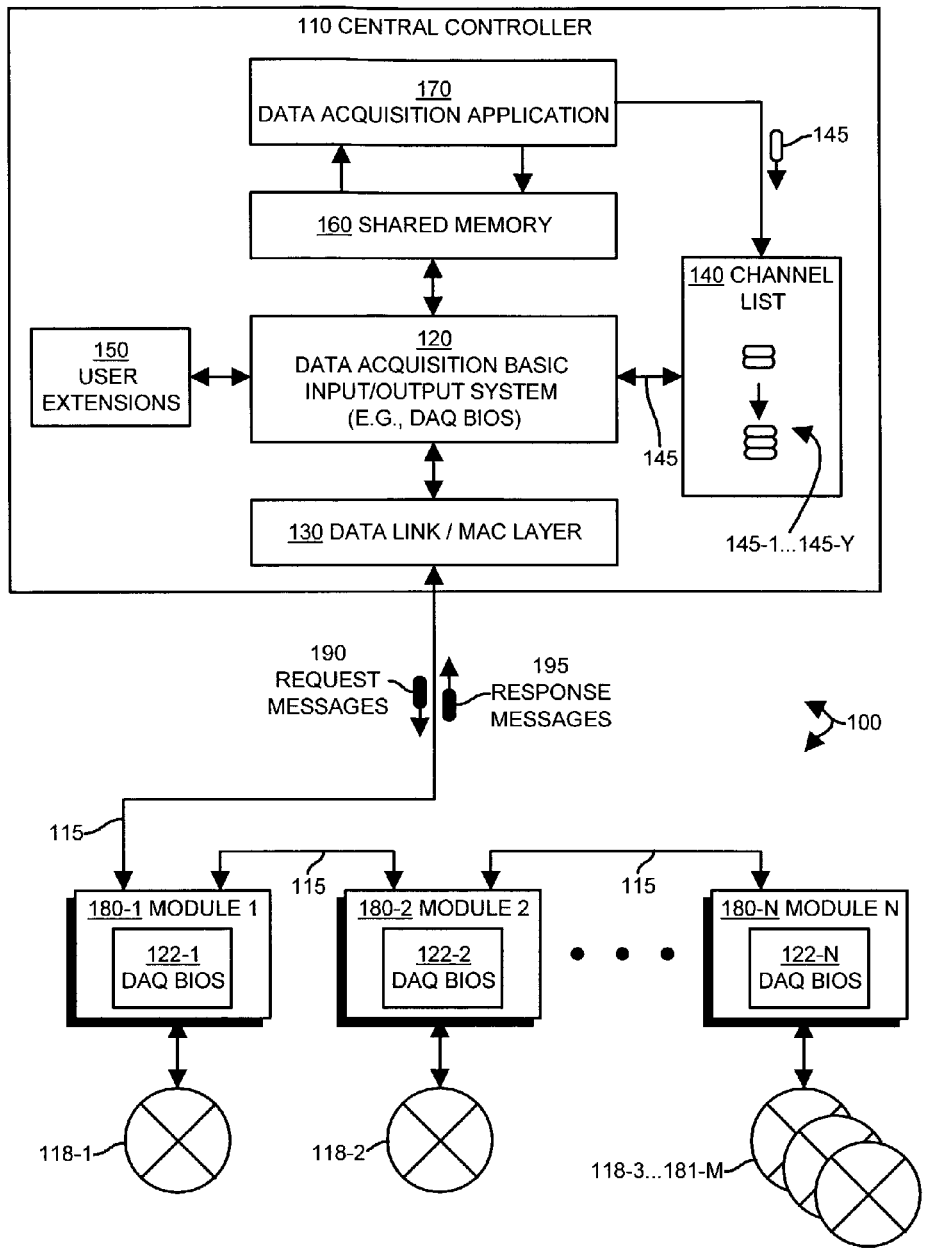
FIG. 1 illustrates an example data acquisition and control system environment including a central controller and a plurality of modules that operate DAQ-BIOS configured according to embodiments of the invention.

FIG. 1 illustrates an example of a data acquisition and/or control system 100 that is suitable for use in explaining example operations of embodiments of the invention. The system 100 includes a central controller 110 coupled via a network medium 115 to a plurality of modules 180-1 through 180-N. Each module 180 is capable of controlling and communicating with one or more devices 118-1 through 118-M. The devices 118 can be any type of equipment, sensors, actuators, machinery or other such elements to or from which the modules 180 may send and receive one or more signals such as digital and/or analog data signals in order to control the device 118 (or to obtain data there from). The central controller 110 and each module 180 are configured with a Data Acquisition-Basic Input Output System or "DAQ-BIOS" 120 (in the central controller 110) and 122-1 through 122-N (within each module 180-1 through 180-N) that operates according to embodiments of this invention. The DAQ-BIOS 120 and 122 components communicate with each other to send request messages 190 (from the central controller 110 to the modules 180 in this example) and response messages 195 (from the modules 180 to the central controller 110 in this example) to allow the central controller 110 to send and receive data and/or commands 145 to and from (and thus control) the operations of the modules 180 and device 118 attached thereto as explained herein.

In addition to the DAQ-BIOS 120, the central controller 110 also includes, in this example, a data link or Machine Access Code (MAC) communications layer 130 which the DAQ-BIOS 120 uses to send and receive requests and response messages 190, 195 onto the network 115, as will be explained. The DAQ-BIOS 120 within the central controller 110 further interfaces in this example with a channel list 140, a set of user extensions 150 and a shared memory 160. A data acquisition application 170 operates on the central controller 110 and is capable of accessing data within the shared memory 160 and can provide sequences of commands 145 (e.g., 145-1 . . . 145-Y) to the channel list 140.

According to the general operation of the data acquisition and control system illustrated in FIG. 1, to begin a process of data acquisition or control of the devices 118, a user (not specifically shown) controlling the data acquisition application 170 can configure the channel list 140 with a sequence of commands 145-1 through 145-Y to be performed (e.g., executed) within the modules 180. As explained in the formerly referenced Provisional Patent Application, a channel list command 145 within the channel list 140 can indicate a destination module 180 (e.g., via an address specifying one or more modules) within which that command 145 is to operate (i.e., is to be processed or executed) and can further indicate data, signals or other information to be sent from the central controller 110 to the module 180 (e.g., for transmission or control of the devices 118 coupled to that specific module 180). A command 145 in the channel list 140 can also specify data, signals, or other information to be retrieved or read from a module 180 (possibly more than one) to which that command is associated. Sets of commands 145 in the channel list 140 can also have associated timing patterns. As an example, a first group of commands may all have an associated variable timing pattern wherein a bit, field or other command indicator in the command 145 designates this command as having the variable timing pattern. These commands are typically arranged in sequential order and identify modules that are to execute these commands. Other commands in the channel list 140 designate have, for example, a fixed timing pattern. It is up to the user/programmer to arrange the commands in the preferred order. It may be that all commands in the channel list use a fixed timing pattern or that all use a variable timing pattern or that some use fixed while others use variable. The DAQ-BIOS 120 is capable of accessing the channel list 140 to obtain commands and can send these commands, according to their timing patterns, to the modules 180 as explained below. The DAQ-BIOS 120 in one embodiment treats the channel list 140 as a circular queue of commands 145 and when it reaches the end (e.g., command 145-Y), it returns to the top of the channel list 140 (e.g., command 145-1) to continue command processing. This can continue until the data acquisition application 170 causes the DAQ-BIOS 120 to stop (e.g., via communication with the DAQ-BIOS 120 via the shared memory 160).

Once the channel list 140 is configured with a sequence of commands 145-1 through 145-Y, the data acquisition application 170 causes the DAQ-BIOS 120 to begin execution of the channel list 140. This causes the DAQ-BIOS 120 to perform as will be explained herein to obtain commands 145 from the channel list 140 and create request messages 190 that are transmitted onto the network 115 for receipt by the modules 180. The DAQ-BIOS components 122 operating within the modules 180 receive the request messages 190 containing the commands 145 (and possibly other data) from the channel list 140, process the commands 145 to either input or output data to or from the devices 118, and return response messages 195 back to the DAQ-BIOS 120 operating within the central controller 110.

In preferred embodiments of the invention, the modules 180 are under the control of the central controller 110 and thus the DAQ-BIOS 120 that operates within the central controller 110 controls which request messages 190 are transmitted to the modules 180 based on the commands 145 in the channel list 140. Accordingly, the DAQ-BIOS components 122 operating within the modules 180 operate as "slaves" to the DAQ-BIOS 120 operating in the central controller 110 and each module responds to those request messages 190. A request message 190 can, for example, instruct a module 180 to output a certain signal at a certain level to one or more devices 118. In response to a request message 190, the DAQ-BIOS 122 in a module 180 can perform the required processing and can return a response message 195 back to the central controller 110 containing, for example, signaling data that may have been requested by a command from a request message 190. In another embodiment, asynchronous events can be sent from the modules 180 to the central controller 110 using response message 195, as will be explained.

Specific details concerning the operation of the DAQ-BIOS components 120 and 122 as configured according to embodiments of the invention will now be explained with respect to the processing steps illustrated in FIG. 2 (DAQ-BIOS operation in the central controller 110) and FIG. 3 (DAQ-BIOS operation in the modules 180) and with respect to the example data acquisition system 100 discussed above with respect to FIG. 1.

Figure 2:
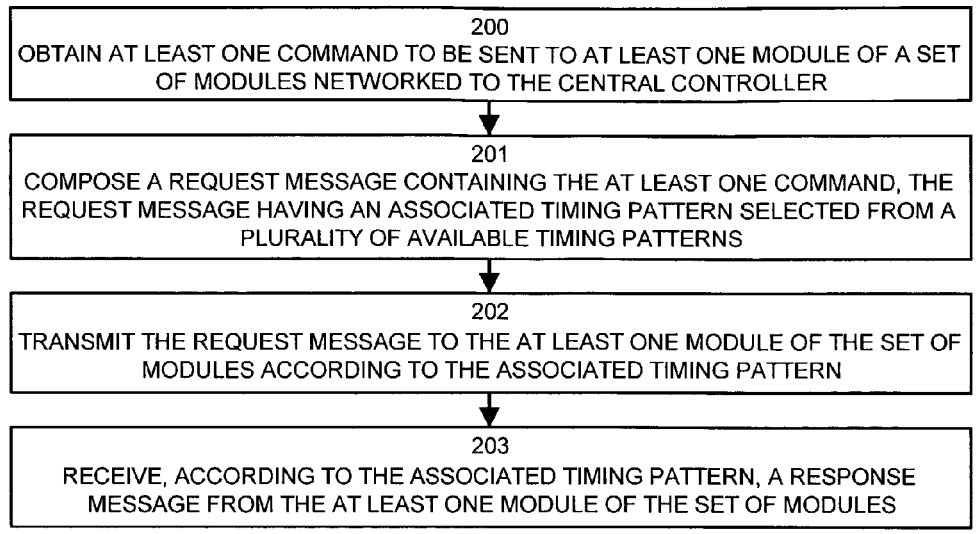
FIG. 2 is a flow chart of processing steps performed by DAQ-BIOS within a central controller configured according to one embodiment of the invention.

FIG. 2 is a flow chart of processing steps that illustrate an example of processing of the DAQ-BIOS 120 operating within a central controller 110 according to one embodiment of the invention.

In step 200, the DAQ-BIOS 120 obtains at least one command 145 (e.g., from the command list 140) to be sent to at least one module 180 of the set of modules 180-1 through 180-N networked to the central controller 110.

In step 201, the DAQ-BIOS 120 operating within the central controller 110 composes a request message 190 containing the command 145 (i.e., one or more commands obtained in step 200). The request message 190 has an associated timing pattern selected by the DAQ-BIOS 120 from a plurality of available timing patterns. The timing pattern may be specified by the command 145 obtained from the channel list 140.

As explained briefly above and as will be explained more thoroughly herein, according to embodiments of the invention, available timing patterns can include a fixed timing pattern that shares request and response time between each module 180 during a request response sequence (i.e., a request message 190 from the central controller 110 fol-lowed by a response message 195 from a specific module 180) in a time sliced manner such that each module 180 processes a request 190 and provides a response 195 within its designated time slice and then the DAQ-BIOS 120 can repeat this process for the next module. The DAQ-BIOS can determine a sequence of modules to which commands are sent in a fixed timing pattern by the arrangement of commands 145 within the channel list 140. The channel list 140 is preferably a sequence of commands 145 that operates in a looping or circular manner such that upon completion of all commands in the channel list 140, the DAQ-BIOS 120 returns to the top of the channel list 140 to again process the sequence of commands 145. In this manner, continuous operation of commands within the modules 180 is achieved.

In another embodiment of the invention as will be explained in the more detail shortly, the DAQ-BIOS 120 provides a variable timing pattern that provides a request message 190 containing commands 145 for more than one module 180 (e.g., sent via a broadcast address) and the respective command set within this variable timing request message 190 for a particular module 180 indicates when that module is to respond to that request message 190 and further indicates an amount of return data to be returned from that module 180 in the response message 195 from that module. In other words, in a variable timing pattern, a single request message 190 can contain one or more commands for multiple modules 180. Each set of commands within this request message 190 can indicate when the respective module 180 to which those commands are to be processed is to respond to the request message 190 with its own respective response message 195. In addition, the request message 190 can identify how much data that particular module is to return to the central controller 110 within its response message 195 at the designated response time. In this manner, multiple commands can be sent to modules 180. The DAQ-BIOS 120 can select module response times such that no module 180 responds during a time at which another module is supposed to respond upon the network 115. In this manner, embodiments of the invention do not require the network arbitration and error correction techniques provided by conventional transport layer protocols such as TCP/IP. As noted above however, embodiments of DAQ-BIOS operate over TCP/IP networks in which case the DAQ-BIOS processes in the modules and central controller interface with the TCP/IP stack as a regular application. These other embodiments however leave open the possibility of non-hard real-time response (i.e., soft real-time) since the TCP/IP processing may induce additional overhead. In addition, such embodiments might operate on networks with other devices attached (i.e., non-dedicated networks) in which case there is a potential for packet collisions that may induce further processing delays. Such embodiments may be useful however in situations where there are large distances between modules and/or the central controller thus requiring the use of data communications devices such as switches and routers on the network to propagate packets.

Next, in step 202, the DAQ-BIOS causes the central controller 110 to transmit the request message 190 to at least one module of the set of modules 180-1 through 180-N according to the associated (i.e., selected) timing pattern (e.g., according to a fixed timing pattern or according to a variable timing pattern). As will be explained in more detail herein, the transmission of message 190 and 195 onto the network 115 uses the data link and machine access code communication layers 130 to frame the request message 190 within an Ethernet frame using MAC addresses for source (e.g., central controller 110) and destination (e.g., one or more modules 180). The DAQ-BIOS 120, 122, according to certain embodiments of the inventin, avoids collisions altogether and provides a time slot for any re-transmission requirements for messages and thus TCP/IP and its associated overhead are not required. Accordingly, performance of a data acquisition and control system using DAQ-BIOS as explained herein exceeds that of conventional systems that utilize TCP/IP or similar transport protocol.

After transmission of the request message 190 onto the network 115 for receipt by one or more modules 180, the modules receive and process the request message as will be explained shortly with respect to FIG. 3. In response, the modules 180 return response messages 195 to the central controller 110.

In step 203, the DAQ-BIOS 120 operating within the central controller 110 receives, according to the associated timing pattern selected in step 201, a response message 195 from the module or modules (e.g., multiple replies at designated response times, as will be explained) to which the original request message 190 was transmitted.

In this manner, the DAQ-BIOS system 120 operating in the central controller 110 can utilize one or more timing patterns to transmit request message 190 to the modules 180. As will be explained shortly, the timing patterns and associated request message formats 190 provide enhanced flexibility for data acquisition and control systems and by transmitting the messages on the network without a requirement for utilization of TCP/IP, performance characteristics of the data acquisition system that utilize the DAQ-BIOS system 120 are significantly increased as compared to conventional systems.

Figure 3:
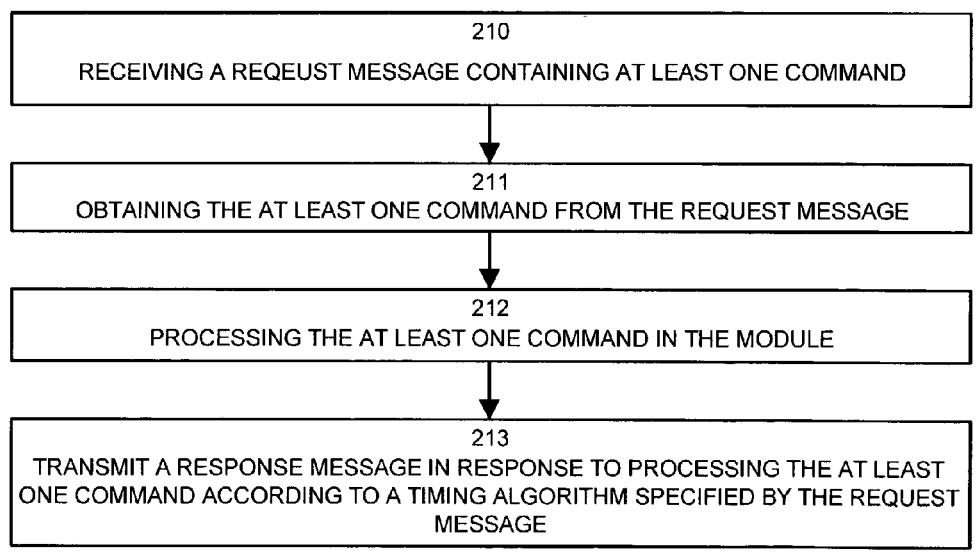
FIG. 3 is a flow chart of processing steps performed by DAQ-BIOS within one or more modules networked to a central controller according to one embodiment of the invention.

FIG. 3 is a flow chart of processing steps performed by the DAQ-BIOS 122 operating within the modules 180 according to one example embodiment of the invention.

In step 210, the DAQ-BIOS system 122 operating within a module 180 receives a request message 190 containing at least one command 145. The request message 190 may have been addressed directly to this module 180 using the fixed timing pattern, or may have been detected by the module 180 via a multicast or broadcast addressing technique in which multiple modules can detect a request message 190 having a single Ethernet address.

Next, in step 211, the DAQ-BIOS system 122 operating in this module 180 obtains the command 145 from the request message 190. As will be explained shortly, the request message format of the request message 190 for a fixed timing pattern includes one or more commands for a single module 180. Accordingly, in step 211 the DAQ-BIOS 122 operating in the module 180 can simply obtain the command at the appropriate (e.g., predefined) location within the request message 190. In an embodiment which uses a variable timing pattern, a request message 190 can include different commands for different modules 180 and thus when a variable timing request message 190 is received by the DAQ-BIOS 122 within module 180, the DAQ-BIOS system 122 can parse or otherwise traverse the contents of the request message 190 in order to locate the appropriate command set designated to be processed by that module 180. In other words, the DAQ-BIOS 122 operating within the modules 180 is capable of locating the appropriate commands within a group of commands designated for multiple modules with a single request message 190 when using the variable timing pattern. Further details on this processing will be explained shortly.

In step 212, once the command is obtained or extracted from the request message 190, the DAQ-BIOS 122 within the module 180 processes the command 145. This can entail extracting signaling information from the command 145 within the request message 190 which can direct the module 180 to output certain signals or other data to one or more devices 118 coupled to the modules 180. In the alternative or in addition to this processing, processing the command 145 can include performing a read operation within the module 180 to sense, read, extract or otherwise gather or collect data from the device 118 for return in a response message 195 to the central controller 110. The exact nature of the command or commands 145 within the request message 190 is not meant to be limiting to embodiments of this invention. To this end, it can be assumed that data can be input to or output from the modules 180 in order to exercise, operate or otherwise control or acquire data from the devices 118 in a hard real-time manner using DAQ-BIOS.

Next, in step 213, the DAQ-BIOS 122 transmits a response message 195 in response to processing the command 145 (step 212) according to a timing pattern specified by the central controller 110. In other words, the DAQ-BIOS 122 transmits the response message 195 at an appropriate predefined response time onto the network 115 such that the response message 195 from this module 180 does not collide or interfere with other messages on the network 115. In a fixed timing pattern, the DAQ-0BIOS 122 can transmit the response message 195 as soon as it is ready. In the variable timing pattern, the DAQ-BIOS can wait until its designated response time arrives, as designated in the command portion for that module as specified in the request message 190.

As an example, when performing request and response message processing using a fixed timing pattern, the DAQ-BIOS 120 causes the central controller 110 to send a single request message 190 to a specific module 180-1 at one time. The DAQ-BIOS 122 within that module 180-1 can immediately (i.e., as soon as possible) thereafter (i.e., after processing steps 210 through 212) respond (step 213) to the request message 190 with a corresponding response message 195 during a time slot of network bandwidth reserved by the central controller 110 for that module's 180-1 response message 195 (the time slot occurring after transmission of the request message 190 to that module). Thereafter (e.g., either immediately after complete reception by the DAQ-BIOS 120 in the central controller 110 of the fixed timing response message 195, or, after expiration of the time slot reserved for reception of the fixed timing pattern response message 195 from the module 180-1), the DAQ-BIOS 120 in the central controller 110 can send a subsequent request message 190 for another module 180-2 onto the network 115 and can await receipt of a corresponding response message 195 during the time slot for response assigned to this other module 180-2. The request—response sequence can continue such that each module 180-1 through 180-N receives a time slot of network bandwidth during which it can receive a request message 190 and can provide a response message 195 in return.

According to the variable timing pattern, a single request message 190 can include commands 145 for multiple modules 180-1 through 180-X (where X can equal N) and each command set within the single request message 190 includes an associated or corresponding response time indicating, to each module 180 containing a command 145 in that request message 190, an associated response time for that particular module 180. The DAQ-BIOS 120 selects the response times for different command sets for different modules to be different within a single request message 190 such that no two modules 180 respond during the same time period on the network 115, thus avoiding collisions and errors. An example of how to compute the response times for a particular module is provided in the example description of details of commands and processing associated with one embodiment of the invention explained in the attached Appendix.

In addition to a response time, the variable timing request message 190 containing commands for multiple modules can specify how much data a particular module 180 is to return in its response message 195, thus providing further control of the utilization of network bandwidth. Accordingly, by specifying a specific response time for a module along with an amount of data that that module 180 is allowed to return to the central controller 110, the DAQ-BIOS 120 provides precise control over the use of the network 115. This results in the ability to provide extremely refined scheduling of transmission resources on the network 115 thus allowing true or hard real-time performance for data acquisition and control.

Figure 4:
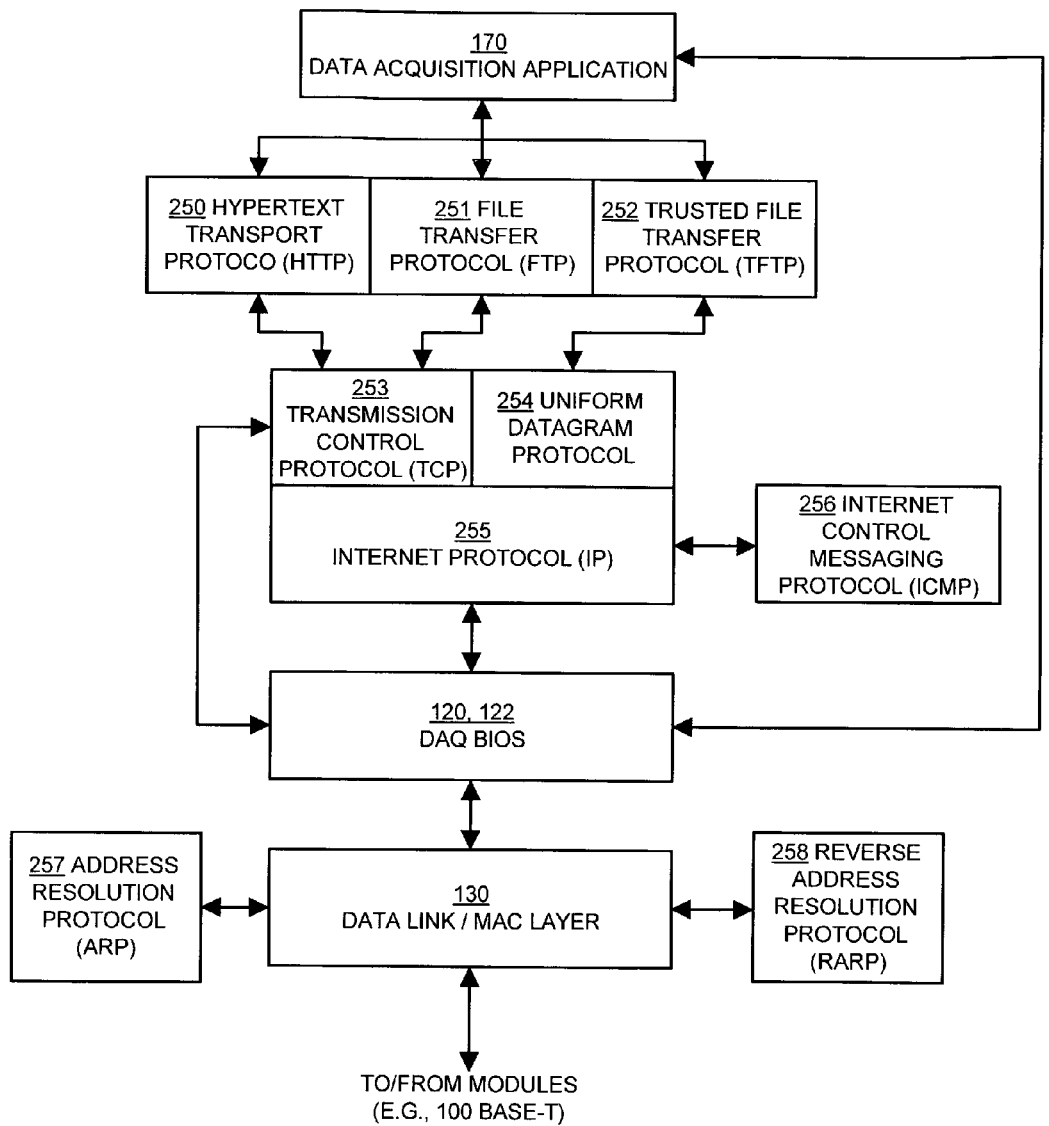
FIG. 4 illustrates a protocol architecture incorporating DAQ-BIOS within a device such as a central controller or module in accordance with one embodiment of the invention.

FIG. 4 illustrates an example protocol architecture that identifies how the DAQ-BIOS system 120 (or 122) of embodiments of the invention relates to other protocols and data communications processes utilized for communication within an example data communications device operating in a data acquisition and control system. In this particular configuration, the DAQ-BIOS 120, 122 resides just above the data link and MAC communications layer 130 and utilizes this layer 130 for encapsulation of request and response messages 190, 195. The MAC layer 130 can interface with an address resolution protocol (ARP) process 257 and a reverse address resolution protocol (RARP) process 258, each of which can be used to transmit Ethernet packets onto the network medium 115. The DAQ-BIOS process 120 within the central controller can also interface directly (e.g., can access the shared memory 160 as illustrated in FIG. 1) to communicate with a data acquisition application 170. In this manner, the DAQ-BIOS 120 in the central controller 110 provides superior real-time performance due to the elimination of the use of TCP/IP 253 in this example embodiment.

It is to be understood that embodiments of the invention are not limited to use of fixed and variable timing pattern without TCP/IP 253. As an example, consider a scenario in which implementations of the data acquisition and control system are configured within a network 115 that contains, for example, other devices beside modules 180 and the central controller 110. This is referred to herein as a non-dedicated network. In such a configuration, it becomes difficult or impossible to guarantee that the network medium 115 is clear for transmission of messages to or from modules 180 and the central controller 110 since the other non-central controller and non-module devices might use TCP/IP and/or CSMA/CA or CSMA/CD. This may be the case because any other devices coupled to the network 115 they have transmission requirements that are not determined by the DAQ-BIOS processes 12122.

Accordingly, for data acquisition and control systems that do not require the optimal in real-time performance, or in other words, that require soft real-time, embodiments of the invention can be implemented in which the DAQ-BIOS processes 12122 resides above the TCP/IP protocol layer 253. In such configurations, the request and response messages 190 in 195 can be encapsulated within TCP/IP packet headers produced by the TCP/Internet protocol layers 253 and 255. In addition, TCP connections may be established between the central controller 110 and each module 180 using the transmission control protocol 253 in order to transmit the request in response messages 190 in 195. Alternatively, UDP 254 could be used but provides no guaranteed delivery. Using such communication mechanisms (i.e., using TCP/IP), the DAQ-BIOS protocol explained herein can still utilize either the fixed or variable timing pattern. However, performance may be degraded due to the overhead required for such things as establishment of TCP/IP connections and Internet protocol and collision avoidance processing. Accordingly, for situations requiring the most optimal real-time performance characteristics (i.e., true or hard real-time) embodiments of the invention that provide a data acquisition application 170 that interfaces directly with DAQ-BIOS 120 which avoids the use of TCP/IP are a preferred implementation.

As also illustrated in FIG. 4, protocols such as the hypertext transport protocol 250 (HTTP), the file transfer protocol (FTP) 251, and a trusted file transfer protocol 252 (TFTP, which utilizes the uniform datagram protocol 254 or UDP), and the Internet control messaging protocol (ICMP) 256 can operate in the architecture as illustrated to exchange messages between the central controller 110 and modules 180 using the DAQ-BIOS 120 and 122.

Figure 5:
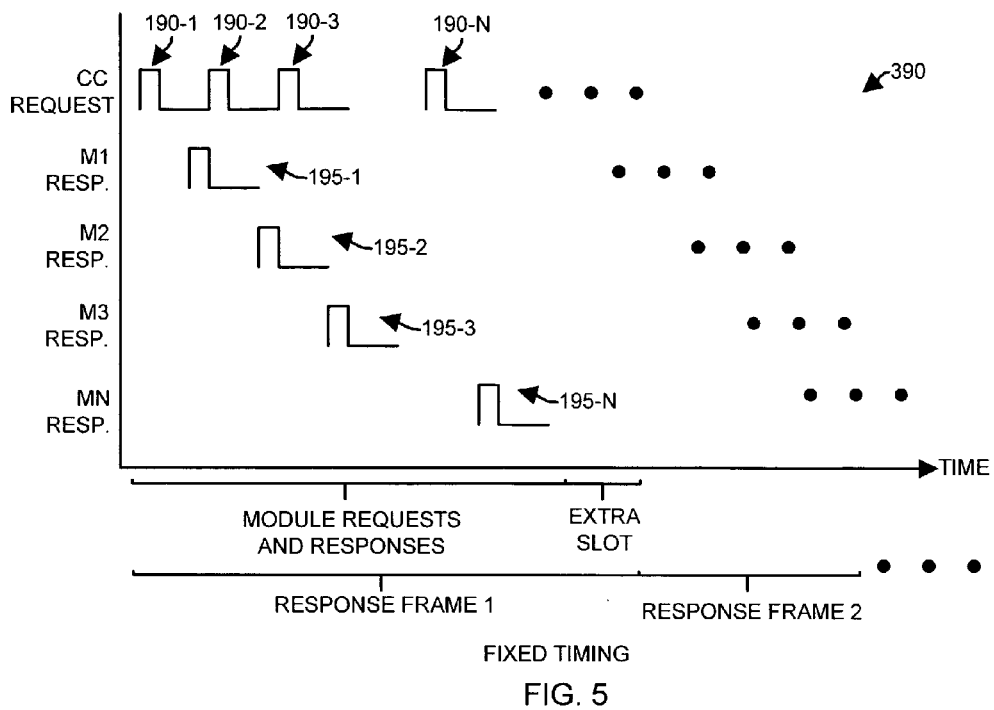
FIG. 5 is a graph that illustrates operation of a fixed timing pattern provided by DAQ-BIOS according to one example embodiment of the invention.
Figure 6:
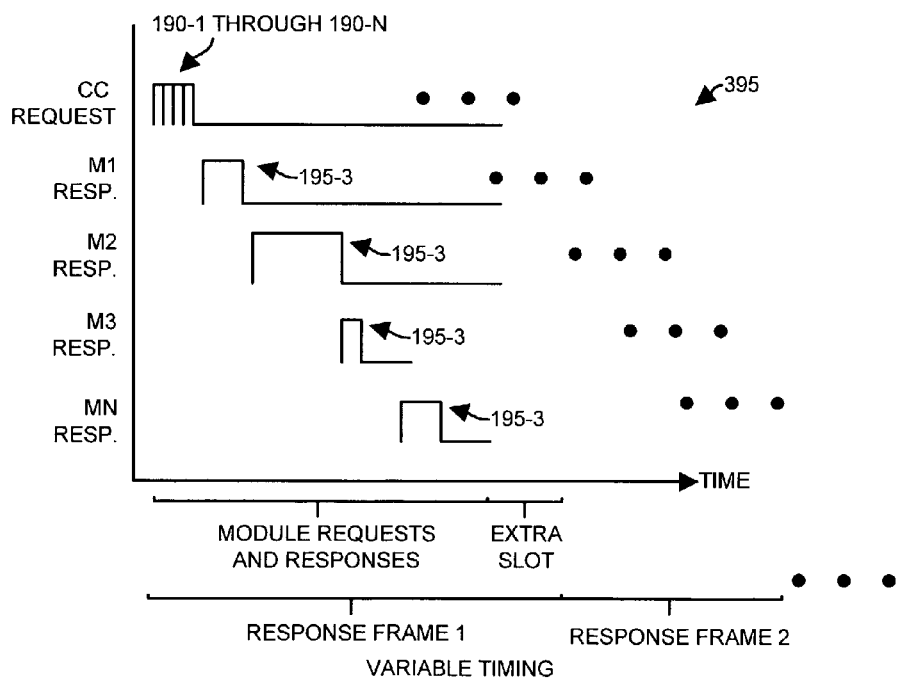
FIG. 6 is a graph that illustrates operation of a variable timing pattern provided by DAQ-BIOS according to one example embodiment of the invention.

FIGS. 5 in 6 illustrate two example graphs of timing patterns that the DAQ-BIOS system 120, 122 of embodiments of the invention can implement to exchange messages between the central controller 110 and the modules 180. Specifically, FIG. 5 illustrates an example of a fixed timing pattern 390 while FIG. 6 illustrates an example of a variable timing pattern 395.

FIG. 5 illustrates an example of the fixed timing pattern 390 as provided by DAQ-BIOS embodiments of the invention. In this example, the top and left of the vertical axis identifies a series of individual request messages 190-1 through 190-N that the central controller 110 transmits to respective modules 180-1 through 180-N. The vertical axis also indicates the signaling and timing pattern of the central controller request message 190 (at the top) and each module response 195, as shown underneath, in successive order.

In this example, each request message 190 in the fixed timing pattern 390 includes one or more commands 145 for a specific respective module 180. As a specific example, the request message 190-1 might contain one or more channel list commands 145 for module 180-1. The request message 190-1 is addressed (i.e., using an Ethernet MAC layer address for optimal performance) on the network 115 for receipt by the module 180-1. After the central controller 110 transmits request message 190-1, a response period of time is provided prior to transmitting the next request message 190-2 (which may be addressed for and contain commands for module 180-2). During this response period of time, module 180-1 provides the response message 195-1. Upon completion of the reception of the response message 195-1 by the central controller 110, the central controller then transmits the request message 190-2 to the next module such as module 180-2. This may be done, for example, after expiration of the response period of time provided by the central controller 110 during which module 180-1 must respond. By setting time between requests 190-1, 190-2, and so forth longer then reply or response time for each module, DAQ-BIOS can be sure that each module will reply in it's designated time slot. This ensures that no collisions happen on the network 115.

As illustrated by the remainder of the fixed timing pattern 390 in FIG. 5, the process of sending individual request messages 190 to specific respective modules 180 and receiving respective response messages 195 from those respective modules to which the request messages 190 were sent continues until all modules 180 have received and responded to the commands defined in the channel list 140.

The fixed timing pattern 390 illustrated in FIG. 5 can perform an entire sequence of request and response messages between the central controller 110 and a series of modules 180-1 through 180-N. This sequence of request and responses is typically defined by the series of commands 145 loaded within the channel list 140 and is illustrated in FIG. 5 by response frames "1", "2" and so forth. Each response frame defines a set of request and response sequences between the central controller 110 and a series of modules 180. In other words, a user who operates the data acquisition application 170 to program the channel list 140 can, in one example, configure the channel list 140 with a series of commands 145 for the sequence of modules to reflect a single pass or sweep of the modules in order to perform data acquisition or control across all modules networked to the central controller. Upon completion of this single pass to each module, the DAQ-BIOS 120 can return to the top of the channel list 140 in order to again repeat the same sequence of commands in an iterative manner.

In the event of an unforeseen network error which corrupts, for example, a single request response sequence between the central controller and an individual module, the fixed timing pattern 390 illustrated in this example embodiment in FIG. 5 can accommodate for such error occurrences by providing an extra slot at the end of the response frame sequence during which the central controller can re-request data from the faulted module (for which a response 195 was corrupted) and can receive an accurate response message. As illustrated, after the final response message 195-N is received from the last module 180-N, in the event of the network error that causes the incorrect reception of a module response message 195 from one of the modules 180 during the module request and response period, the DAQ-BIOS 120 operating within the central controller 110 can wait for a delay time slot or extra slot to expire before repeating the steps of obtaining the next commands from the top of the channel list 140 in composing and transmitting the next series of request and response messages to the set of modules network to the central controller. In other words, the fixed timing pattern illustrated in FIG. 5 can compensate for any potential errors in the sequence of request and response for a particular module by providing extra slot in which to re-request a response message from a particular module affected by the error. Using the extra time slot, the central controller can resend request packets 190 in the extra slot if it has not received a reply response message 195 for a particular module 180 in a designated amount of time. Alternatively, a module that has additional data to send to the central controller can use the extra time slot to transmit this additional or extra data.

FIG. 6 illustrates an example of a variable timing graph or diagram 395 used by the DAQ-BIOS 120 and 122 to transmit request and response messages between the central controller 110 and modules 180. The vertical axis to the left of the variable timing diagram 395 indicates the signaling pattern of the central controller request message 190 at the top and each module response 195 is shown underneath in successive order. The variable timing pattern 395 shares time between modules 180 based on a single bundled request message 190 that uses a multicast or broadcast address such that each module 180 detects the request message 190 containing commands 145 (e.g., containing individual request messages 190-1 through 190-N for each individual module 180-1 through 180-N) applicable to multiple modules 180.

Note that in the variable timing pattern 395, each response message 195-1 through 195-N sent from a respective module 180-1 through 180-N uses a different amount of time to completely respond to the central controller 110. This is because the bundled request message 190 identifies, for each module 180, a response time that indicates a predefined delay by which that particular module 180 is to wait before transmitting its particular response message 195 after receiving the multicast bundled request message 190. One advantage to this technique is flexible bandwidth control since the size of the transmission response time and response size can be adjusted dynamically. Each response message 195 can indicate whether or not a particular module 180 has additional data or information to be transmitted to the central controller 110 during the request response sequence (i.e., during a response frame). As an example, during response frame 1, in the event that a particular module 180-X indicates that additional data is available to be sent to the central controller 110, during the next response frame 2, the central controller can providing bundle request message 192 that allocates additional time for that particular module 180 to respond with a response message 195 and can indicate to that module that additional data should be transferred in net response message to the central controller as compared with the previous response message 195 cents finance a module in a previous response frame.

As will be explained more detail shortly, the central controller determines a response time for the commands process by a module and further selects the amount of return data to be returned in a response message 195 for the module 180. In a return response message 195, a module can indicate if additional data is available for transmission to the central controller 110. This operates like a feedback mechanism to the central controller 110. By adjusting the response time and amount of data values during successive generations of response frames, the amount of data collected for modules can be adjusted, for example, to retrieve more data from some modules and less from others or to increase the amount of data received from a module and producing more data during the processor data acquisition (e.g., during an ongoing experiment, simulation or other situation in which amounts of data vary when produced from different modules). By resizing the response message transmission window, the DAQ-BIOS system can allow more or less data to be transferred either from the central controller 110 to a particular module 180 (i.e., by including more data for this module in the bundle request message 190) or by indicating to that module an increased amount of data to that module can return to the central controller in net particular modules response message 195.

In addition, the bundled request message 192 can indicate when each particular module 195 for which that bundle request message 192 contains at least one commands 145 is to respond. Accordingly, during different response frames, the order in which different modules 180 respond can change. As an example, as illustrated in FIG. 6, the order of module responses in response frame 1 is 180-3, 180-1, 180-2 and 180-N. In a subsequent response frame 2, the DAQ-BIOS 120 can alter this order in a subsequent bundled response message 190.

Figure 7:
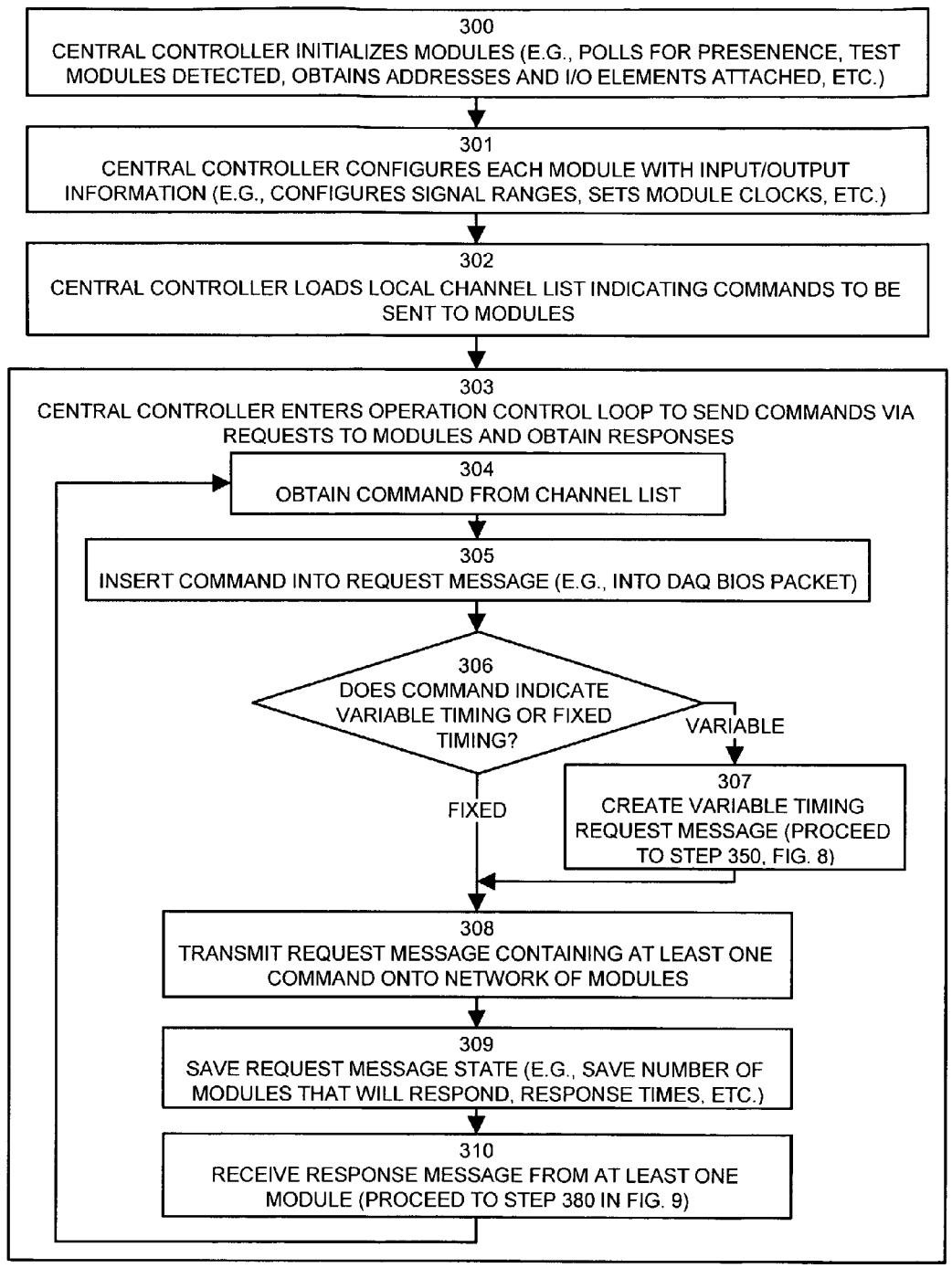
FIG. 7 is a flow chart that illustrates details of processing performed by a central controller configured with DAQ-BIOS according to one example embodiment of the invention.

FIG. 7 is a flow chart of processing steps performed by a DAQ-BIOS 120 operating within the central controller 110 according to one example embodiment of the invention to process request and response messages 190 and 195.

In step 300, the central controller 110 initializes the modules to prepare for processing commands 145 from the channel list 140. As an example, the processing of step 300 can include polling each module for its presence on the network 115 and performing tasks to determine that each module is functioning properly. In addition, DAQ-BIOS can detect each modules address (i.e., Ethernet MAC layer address) and each module can report back to the central controller identifying the various elements or devices 118 couple to that module 180.

Next, in step 301, the central controller 110 configures each module, for example, with input output information to be used during processing of commands 145 from the channel list 140. Configuration of the modules can include configuring signal ranges for signals (e.g., analog and digital signals) to be input and output from the modules 180 to devices 118, setting module clocks and signal timing mechanisms and the like. Once the modules are configured properly, processing proceeds to step 302. Example operations related to step 300 and 301 are provided in the Appendix that described functions used in an example implementation of one embodiment of the invention.

In step 302, the central controller loads the channel list 140 indicating the commands 145 that are to be sent to the modules 180 during operation of the request and response sequencing. This may entail the data acquisition application 170 providing or programming specific channel list commands 145 into the channel list 140 in a predetermined order that dictates how to exercise the specific modules 180 during request response operation of the DAQ-BIOS 120 and 122. In one embodiment of the invention, the channel list 140 represents a circular list of commands 145 that the DAQ-BIOS 120 sequentially cycles through using request and response message sequencing as explained herein in order to provide commands to the modules 180 for acquiring data or controlling the devices 118 connected to those modules 180. Once the modules are initialized and configured and the channel list 140 is established containing the commands to be used to exercise or otherwise operate the modules 180, processing proceeds to step 303 for operation of the channel list commands.

In step 303, the central controller 110 enters operation of a control loop to send the commands 145 in the request messages 190 to the modules 180-1 through 180-N and to obtain response messages 195 containing data output from the modules 180. Processing steps 304 through 310 illustrate details of processing of this operation control loop (i.e., step 303) according to one example operation of embodiments of the invention. In other words, this example operation control loop (i.e., step 303) comprises the operation of the DAQ-BIOS 120 within the central controller 110 in order to exercise the modules 180.

In step 304, the DAQ-BIOS 120 obtains a command 145 from the channel list 140.

Next, in step 305, the DAQ-BIOS 120 inserts the commands 145 into a request message 190 causing a DAQ-BIOS packet to be formed. Details of this packet format will be explained shortly.

Next, in step 306, the DAQ-BIOS determines if the commands 145 obtained from the channel list 140 indicate whether the timing pattern to be used for this command is either a variable timing pattern or a fixed timing pattern. As discussed above, a fixed timing pattern (FIG. 5) operates to send one or more commands 145 to individual modules in separate request messages 190 whereas a variable timing pattern allows a bundled request message 190 (FIG. 6) to be created containing multiple commands 145 for different modules 180. Accordingly, in step 306, in this example embodiment, if the command obtained from the channel list and inserted into the request message 190 (e.g., in steps 304 and 305) indicates that a variable timing pattern is to be used processing proceeds to step 307.

Figure 8:
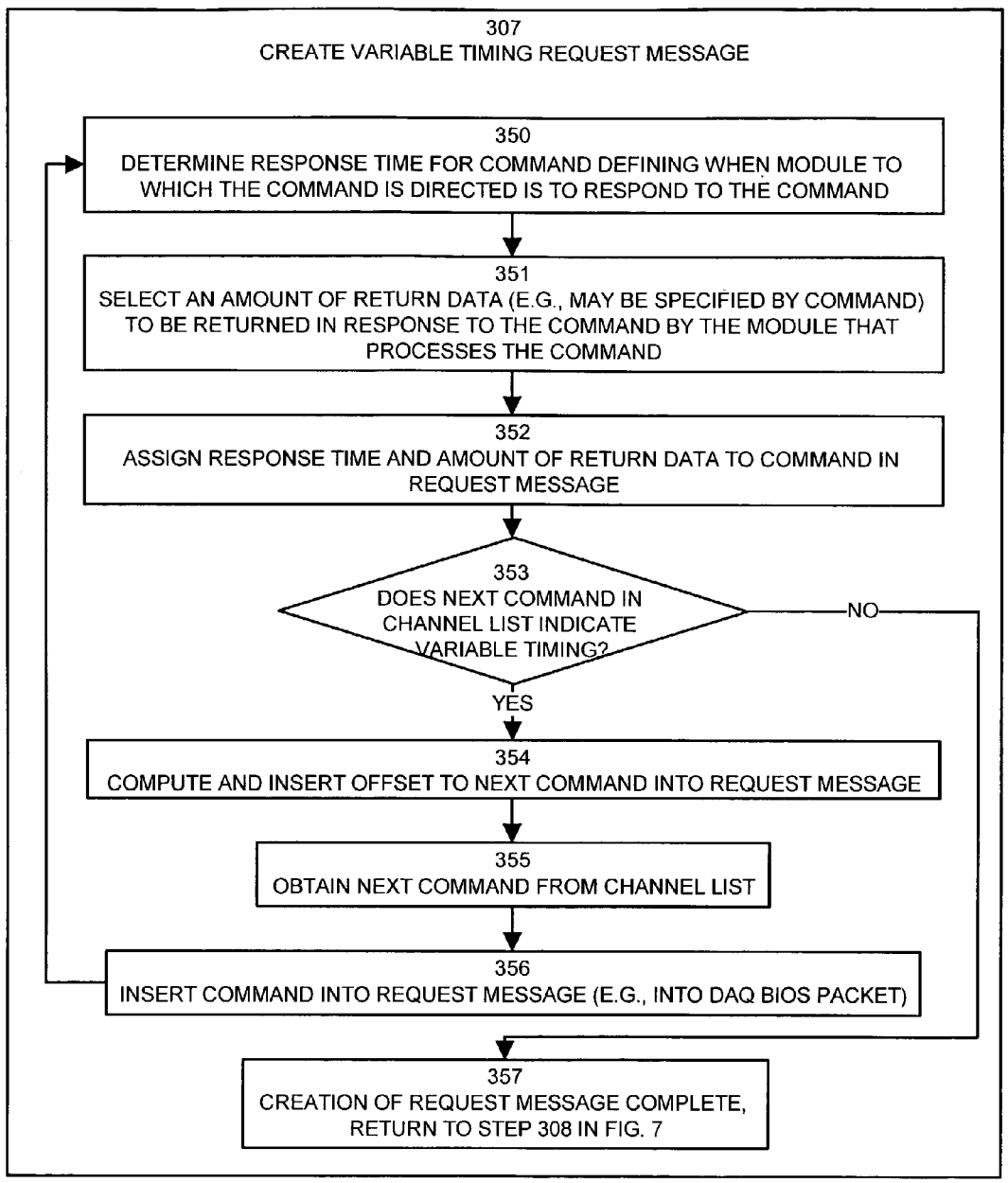
FIG. 8 is a flow chart that illustrates an example of processing steps performed by DAQ-BIOS to create a variable timing request message sent from a central controller to multiple modules according to one embodiment of the invention.

In step 307, when a variable timing pattern is in use, the DAQ-BIOS creates a variable timing request message 190 by proceeding to step 350 at the top of FIG. 8. This processing of FIG. 8 will be discussed shortly.

Returning attention now back to step 306, in the event that the command 145 obtained from the channel list 140 indicates that a fixed timing pattern is to be used for this command, the DAQ-BIOS 120 proceeds to process steps 308 through 310.

In step 308, the DAQ-BIOS 120 transmits the request message 190 containing at least one command 145 onto the network 115 of modules 180. Depending upon the timing pattern in use, the request message 190 will either be sent using a fixed timing pattern request message containing the address of the single module 180 on the network 115 or, in an alternative embodiment of the invention, the request message will be a bundled request message 190 containing multiple commands for multiple modules 180 and may include a multicast or broadcast address which each module 180 can use or respond to in order to receive the request message 190.

Next, in step 309, after transmission of the request message 190 onto the network 115, the DAQ-BIOS 120 saves any required request message state. In this example embodiment of the invention, the DAQ-BIOS 120 can save, for example, the number of modules that are expected to respond to this particular request message 190 as well as the particular response times at which those modules 180 are expected to respond and a can save a stated amount of data which is required or expected to be received from each module 180. In this manner, using the request message state, the DAQ-BIOS 120 can determine if response messages 195 that are later received in response to transmission of the request message 190 are accurate (i.e., are received from the appropriate modules at the appropriate times and contain an appropriate amount of response data).

Next, in step 310, the DAQ-BIOS 120 receives a response message 195 from at least one module 180 on the network 115. Processing of response messages 195 by the DAQ-BIOS 120 is illustrated in detail beginning at step 380 in FIG. 9, which will be explained shortly. After receipt of a response message from at least one module 180, processing returns to step 304 in the operation control loop in order to send another command 145 (or group of commands in the case of variable timing) to one or more modules on the network 115. In this manner, the DAQ-BIOS processing repeats itself and successive commands 145 contained within the channel list 140 are transmitted to the modules 180 for the central controller 110. This processing can continue for a full sequence of commands 145 within the channel list 140 and upon reaching the last command of the channel list 140, the DAQ-BIOS 120 can again repeat the processing commands 145 beginning at the top of the channel list 140. This processing of channel list commands by modules can continue until the data acquisition application 170 indicates to the DAQ-BIOS 120 that processing is now complete.

FIG. 8 is a flow chart showing (in steps 350 through 357) the details of processing step 307 from FIG. 7 as performed by the DAQ-BIOS 120 within the central controller 110 to create a variable timing request message 195 containing one or more commands 145 for multiple modules 180 according to one example embodiment of the invention.

In step 350, the DAQ-BIOS 120 determines a response time for the command 145 obtained from the channel list 140 (in step 304 in FIG. 7) that defines when the module 180 to which this command is directed is to respond to this command 145. In other words, in step 350, the DAQ-BIOS 120 identifies the time within the variable timing pattern at which the particular module 180 to which this command is directed is to respond after processing the command 145. In a preferred embodiment of the invention, the response times for each module 180-1 through 180-N may each be different when a bundle variable timing pattern request message 190 is used to transmit a group of commands to each of the modules on the network 115. In this manner, each module 180 response 195-1, 195-2 . . . 195-X (where X is the number of modules for which commands are contained in the bundled request message 190) will provided at a different time thus avoiding collisions on the network 115.

Next, in step 351, the DAQ-BIOS 120 selects an amount of return data to be returned in response to the command 145 by the modules 180 that process that command 145. In other words, in step 351, the DAQ-BIOS determines how much data should be returned in response to processing this particular command by a particular module. The amount of return data selected in step 351 determine, to some extent, the next response time of another module to which a variable timing request message (i.e., a bundle request message) 192 is sent. As an example, if the response time for a particular module 180-1 is time P, and 1 kilobyte of data is to be returned from this module 180-1, then the response time for a next responding module 180-2 in the variable timing sequence will be time P plus the amount of time required for the module 180-1 to respond with 1 kilobyte of data on the network 115. Accordingly, the DAQ-BIOS 120 can keep an accounting of response times and amounts of data that are to be requested from each module 180 for use in determining subsequent response times for other modules from which data is requested by the same bundled request message 190 used in the variable timing pattern.

In step 352, the DAQ-BIOS 120 assigns the response time and the amount of return data to the command within the request message 190 (i.e., which is a bundled request message 190 for the variable timing pattern).

Next, in step 353, the DAQ-BIOS 120 examines the next command 145 in the command list 140 to determine if the next command in the channel list indicates a variable or fixed timing pattern. Each command 145 in the channel list 140 can indicate whether it is to be part of a variable or fixed timing pattern when sent within a request message 190 to the modules 180. Accordingly, in a preferred arrangement of the channel list 140, those commands that are to be collectively sent to multiple modules 180 at the same time should be sequenced together in a serial or sequential manner within the channel list 140 such that they are bundled within a single variable timing request message 190. Accordingly, in step 353, if the next command in the channel list indicates a fixed timing pattern, processing proceeds to step 357 at which point the creation of the bundled request message 190 is complete and processing returns to step 308 in FIG. 7. Alternatively, in step 353 if the next command in the channel list indicates that it is associated with the variable timing pattern, than this next command 145 in the channel list 140 is also to be included within the bundled request message 190 which has already been created by at least one pass of the processing in FIG. 8. Accordingly, processing proceeds to step 354.

In step 354, the DAQ-BIOS 120 computes and inserts an "offset" to the next command 145 into the request message 190 being created by this processing in FIG. 8. In particular, since a single bundled request message 190 is capable of containing multiple commands for multiple modules 180, the command(s) to be executed that are applicable to one module are delineated or separated from the command or commands applicable to another module within the request message 190. Accordingly, since the bundled request message 190 is a collection of commands applicable to different modules, the command set containing one or more commands for one module may be displaced by the offset that DAQ-BIOS 120 computes in step 354 into the request message 190. An example data structure for a variable timing pattern bundled request message 195 is shown in the attached Appendix. As will be explained shortly with respect to module processing of a request message in FIG. 10, a module 180 that receives a request message containing commands for many modules can use this offset to traverse or parse the request message 190 containing many commands 145 for many modules to locate the command set within that request message which is applicable to that particular module.

Next, in step 355, the DAQ-BIOS 120 obtains the next command 145 from the channel list 140. The command that the DAQ-BIOS 120 obtains in step 355 is the command which step 353 identified as being part of the variable timing pattern and thus should be included within this bundled request message 190 being formulated by the processing illustrated in FIG. 8.

Next, in step 356 the DAQ-BIOS 120 inserts the command 145 (obtained in step 355) into the bundled request message 190. In other words, in step 356, the DAQ-BIOS 120 inserts the command into a DAQ-BIOS packet being formed by the processing shown in FIG. 8. Thereafter, processing proceeds back to step 350 to repeat the aforementioned processing for this command just inserted into the request message.

In this manner, according to the processing illustrated in the example embodiment shown in FIG. 8, the DAQ-BIOS 120 is able to produce the request message 190 that contains multiple bundled commands for multiple modules 180. After the processing of FIG. 8 is complete, step 357 causes the processing to return to FIG. 7 to perform steps 308, 309 and 310 in order to transmit the bundled request message 190 to the modules 180-1 through 180-X and to receive a response for each module as explained herein.

Figure 9:
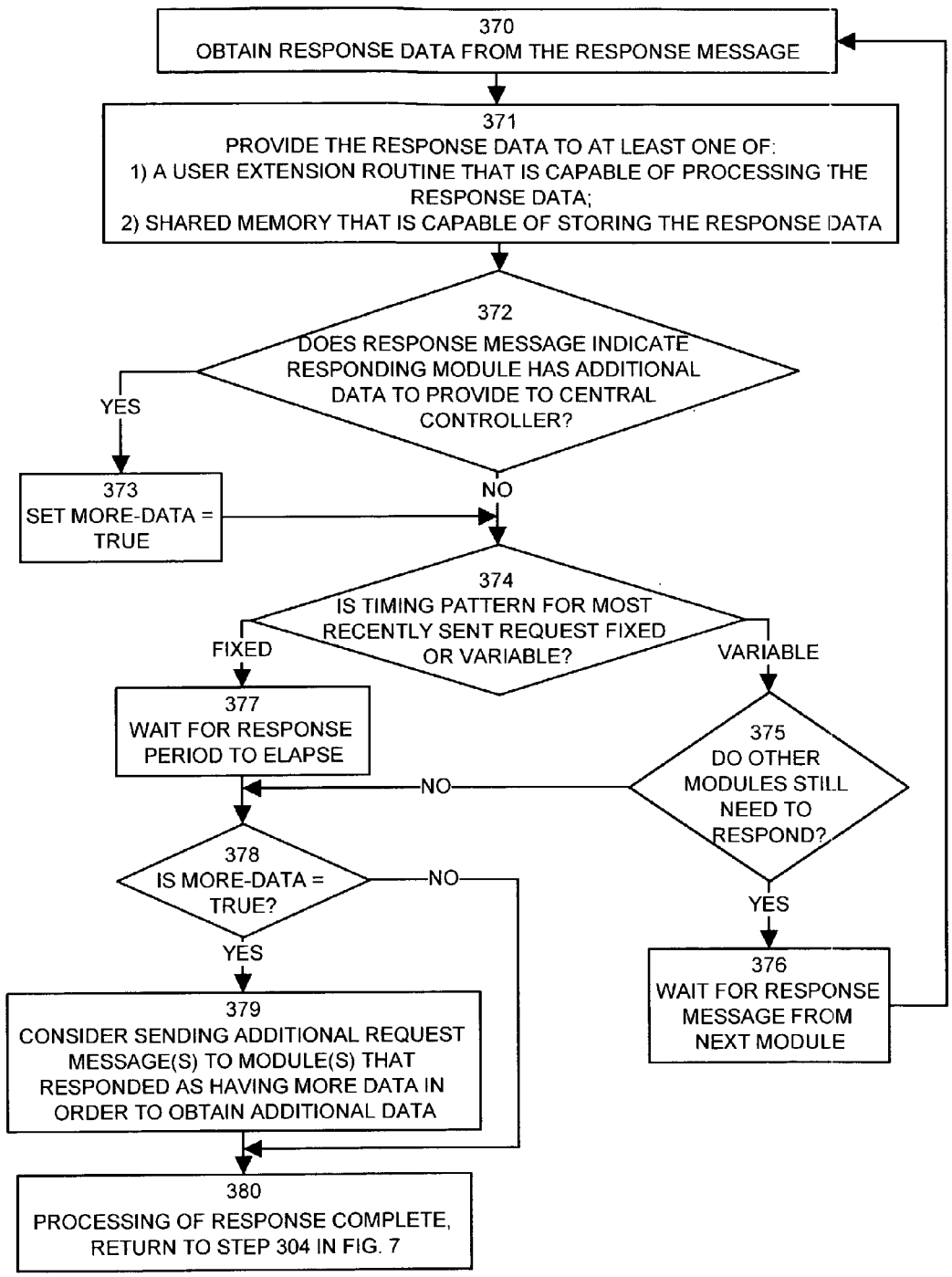
FIG. 9 is a flow chart that illustrates an example of processing performed by DAQ-BIOS within a central controller to process response messages received from a module according to one example embodiment of the invention.

FIG. 9 is a flow chart of processing steps which describe processing operations performed by the DAQ-BIOS 120 operating within the central controller 110 in order to obtain and process response data contained within the response message 195 received from a module 180 that has responded to a request message 190 (either bundled or for fixed timing pattern). Generally, processing of response messages for both the fixed and variable timing patterns is quite similar in this embodiment of the invention. However, differences do exist since the DAQ-BIOS 120 operating a variable timing pattern will receive multiple responses for multiple modules in response to transmitting a single request message whereas in the fixed timing pattern, once a response is received from a single module, processing can return to the end of step 309 FIG. 7 in order to continue processing commands 145 in the channel list (i.e., by returning to step 304 FIG. 7).

In FIG. 9, in step 370, the DAQ-BIOS 120 obtains response data from within the response message 195.

In step 371, the DAQ-BIOS 120 provides the response data to either the user extension routine 150 (FIG. 1) that is capable of processing response data, or provides the response data to shared memory 160 (also shown in FIG. 1). In this manner, immediately (i.e., as soon as possible) upon receipt of a response message 195, the DAQ-BIOS 120 extracts the response data and provides it to its proper destination for the fastest processing time possible.

According to one embodiment of the invention, it may be possible that the amount of response data that a request message 190 indicates that a module 180 can supply back to the central controller 110 within a response message 195 is less than the actual amount of data that the module has acquired from the device 118. In other words, the module 180 may have more data waiting to be transported back to the central controller 110 than what is capable (e.g., due to packet size limitations) in a single response message 195. Accordingly, in step 372, the DAQ-BIOS 120 operating in the central controller 110 determines if the response message 195 indicates that the responding module 180 has additional data to provide to the central controller 110. If the response message 195 indicates that additional data is available to the module, processing proceeds to step 373.

In step 373, the DAQ-BIOS 120 sets a "MORE-DATA" flag value to "TRUE" and processing proceeds to step 374. The MORE-DATA flag indicates that a module 180 has additional data to be returned to the central controller.

In step 372, if the response message does not indicate that additional data is available for the module or after processing steps 373, in either event processing proceeds to step 374.

In step 374, the DAQ-BIOS 120 determines if the timing pattern for the most recently sent request message 190 is a fixed or variable timing pattern. In other words, in step 374, if the most recently transmitted request message 190 is transmitted to a module according to a fixed timing pattern, processing proceeds to step 377. Alternatively, if the most recently transmitted request message 190 included commands for multiple modules and thus was transmitted according to a variable timing pattern, processing proceeds to step 375.

In step 375, the DAQ-BIOS 120 determines if other modules still need to respond to the request message 190. In other words, the DAQ-BIOS in step 375 determines if it has received responses 195 from all modules 180 to which commands were contained were directed within the most recently transmitted request message 190. If all modules have responded, processing proceeds to step 376.

In step 376, the DAQ-BIOS 120 has completed processing for the most recently received response message 195 and waits for the next response message 195-X from the next module 180-X. Upon receipt of the next response message 195, processing returns to step 370 at the top of FIG. 9 in order to process this message as explained herein.

Returning attention now to step 375, the if no other modules need to respond to the most recently transmitted request message 190, processing proceeds to step 378 for completion of response processing according to steps 378 through 380.

Accordingly, according to the processing path shown in FIG. 9 from step 374 to 375 and then to 376, the DAQ-BIOS receives a response message 195 from a module in determines that other modules have still yet to respond during the variable timing response sequence and DOS processing returns to step 370 to obtain response data from the next response message.

Returning attention now to step 374, if the timing pattern is a fixed timing pattern, processing proceeds to step 377 and then no more response messages 195 are expected from any other modules 180. At this point, DAQ-BIOS 120 waits for the response period or time allocated to the module to elapse or complete. In other words, if a response time T is allocated in a fixed timing pattern to completely receive a response message 195 from a particular module and that response message for that module is received in a time shorter than time T, than in step 377, the DAQ-BIOS 120 and central controller can wait for the time T to completely elapse before sending the next request message 190-X to the next module. Note that in step 377, in a fixed timing pattern, it is optional and in an alternative embodiment of the invention, as soon as a response 195 is completely received from a module in a fixed timing pattern, processing can proceed from step 374 to step 378 to send the next request message 190.

In step 378, the DAQ-BIOS 120 determines if the MORE-DATA flag was set to true in step 373. If so, processing can proceed to step 379. Recall that the MORE DATA flag indicates that a particular module had provided the response message 195 to the DAQ-BIOS 120 that indicated that module 180 has additional data to be returned to the central controller 110. In such cases, processing proceeds to step 379.

In step 379, the central controller under the control of the DAQ-BIOS 120 can consider sending additional request messages 190 to any modules 180 that responded as having more or additional data available for receipt by the central controller in order to obtain additional data from these modules. This can be accomplished, for example, by sending separate request messages to those modules having extra data after completion of a response frame as illustrated in either the fixed or variable timing pattern in FIGS. 5 and 6. That is, according to this embodiment of the invention, processing can briefly deviate from command list processing in order to send additional request messages 190 to those modules 180 that have responded during a particular response frame of a fixed or variable timing sequence and which indicated to the central controller 110 that they have additional data to provide. Accordingly, during receipt of response message in a response frame for one sequence of modules 180, the DAQ-BIOS 120 can "remember" which modules indicated they have additional data to be transmitted back to the central controller. After completion of the response frame, this embodiment of the invention can then go back and send additional request messages 190 to only those modules that indicated they have additional data to be forwarded to central controller. After receiving response messages 195 to these extra request messages 190, routine DAQ-BIOS processing can be returned in order to perform another response frame according to the fixed or variable timing diagram as dictated by the arrangement of commands 145 within the channel is 140.

After processing step 379, or any alternative, if the processing in step 378 determined that no modules have additional data to be transmitted essential controller, processing proceeds to step 380 to return to step 304 in FIG. 7. In this manner, processing returns to again performed commands within the channel is 140.

Using the aforementioned processing operations of the DAQ-BIOS 120 within a central controller 110, embodiments of the invention are capable of controlling data acquisition in an extremely precise and high-performance manner. Through the selection of different timing patterns for use in sending and receiving request and response messages between the central controller 110 and the modules 180, embodiments of the invention allow a user to set up the channel list 140 which can contain commands 145 to query certain modules using, for example, a fixed timing pattern while other modules are queried for data or are controlled using variable timing patterns.

Figure 10:
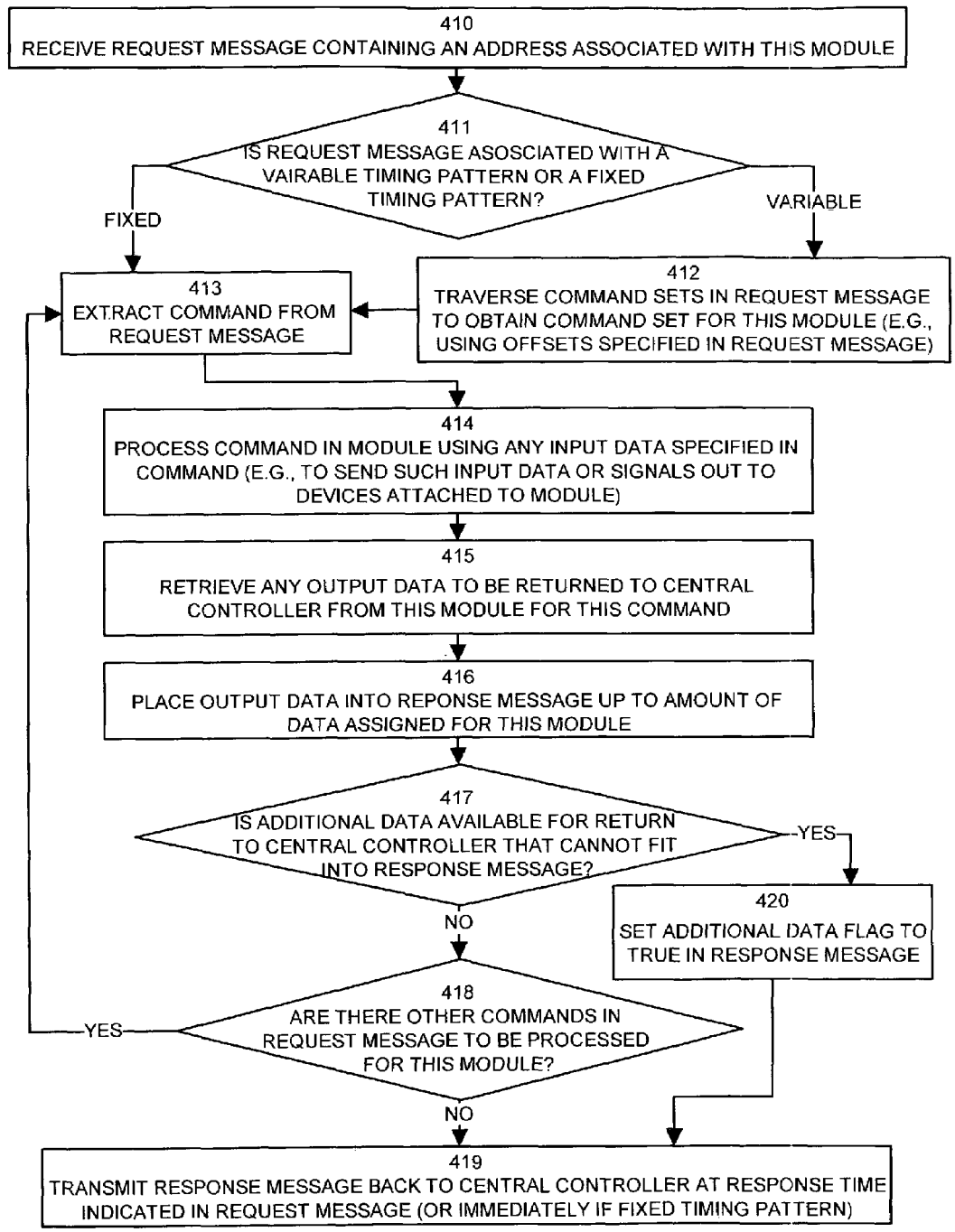
FIG. 10 is a flow chart that illustrates an example of processing performed by DAQ-BIOS within a module to process a request message and produce a response message according to one embodiment of the invention.

FIG. 10 illustrates an example of processing steps performed by the DAQ-BIOS 122 operating within the modules 180 according to one example embodiment of the invention in order to receive and process the request message 190 and to produce a corresponding response message 195.

In step 410, the DAQ-BIOS 122 operating within a module 180 receives a request message 190 containing at least one command and that has an address associated with this module 180 (e.g., either that modules unique address or a multicast or broadcast address). This processing can entail a data link layer operating within the module 180 detecting the DAQ-BIOS packet transmitted onto the network 115 containing a MAC layer Ethernet address to which this module 180 has been configured to respond. If the request message 190 was transmitted according to the fixed timing pattern as previously explained, the request message has an Ethernet address equivalent to the unique Ethernet address of this particular module receiving request message. Alternatively, modules can also be configured to recognize Ethernet addresses which are referred to herein as multicast or broadcast addresses which allow multiple modules 180 to each detect a packet on the network 115. In this manner, the central controller 110 can transmit a variable timing packet containing a bundled request message 190 which is destined for multiple modules using a single Ethernet destination MAC layer address which each module that is configured to recognize that address will receive and process.

Next, in step 411, the DAQ-BIOS 122 determines if the request messages is associated with a variable timing pattern or a fixed timing pattern. If the request message 190 is a bundled request message and is received according to a variable timing pattern, processing proceeds to step 412.

In step 412, the DAQ-BIOS 122 traverses the command sets contained within the bundled request message 190 in order to obtain the command sets associated with this module 180. The particular command set associated with this module within the bundled request message 190 can be located using the offset information computed in step 354 in FIG. 8 as explained above. After obtaining the command or commands within the request message in step 412, processing proceeds to step 413.

Returning attention to step 411, if the DAQ-BIOS 122 uses a fixed timing pattern to receive the request message 190 processing proceeds to step 413.

In step 413, the DAQ-BIOS extracts the command 145 from the request message 190 to be performed within this module 180.

In step 414, the DAQ-BIOS 122 processes the command 145 within the modules 180 using any input data specified in the command. As an example, the command may include a single level or other information which the DAQ-BIOS 122 can send his input data were signals from the module 180 to one or more devices 118 coupled to the module 180.

In step 415, the DAQ-BIOS 122 retrieves any output data to be returned to the central controller 110 from this module 180 in response to processing this command 145.

In step 416, the DAQ-BIOS places the output data into a response message 195 up to an amount of data assigned for this module 180. As explained above with respect to step 352 in FIG. 8, a request message 190 can indicate an amount of response data that the module 180 should return in response to the request message 190. This information is used in step 416 to place the correct amount of output data or response data into the response message 195 that will be transmitted by the DAQ-BIOS 122 in this module 180 back to the central controller 110.

Next, in step 417, the DAQ-BIOS 122 operating within the modules 180 determines if additional data is available for return to the central controller 110 from the module that can fit into the response message 195. In other words, in step 417, the DAQ-BIOS 122 determines if there is more output data available in the module 180 than what was requested by the amount of return data specified in the request message 190 from essential controller 110. If additional data is available for return to essential controller 110 from this module 180 (i.e., more data can what can fit into a single response message 195), processing proceeds to step 420.

In step 420, the DAQ-BIOS 122 sets an "ADDITIONAL DATA FLAG" to "TRUE" in the response message 195. This flag can indicate to the DAQ-BIOS 120 operating in the central controller 110 that this particular module 180 has additional data available for retrieval should the central controller 110 opt to obtain such data. As discussed above with respect to step 372 in FIG. 9, the central controller can detect this ADDITIONAL DATA FLAG in order to consider, in step 379, sending additional request messages 190 to the module 180. If processing performs step 420, then it can be assumed that the response message 195 is already completely filled to capacity with response data and thus processing proceeds to step 419.

In step 419, the DAQ-BIOS 122 operating in the module 180 transmits the response message 195 back to the central controller 110 at a response time indicated in the request message 190, or, in the case of using a fixed timing pattern, the DAQ-BIOS 122 can immediately transmit the response message 195, back to the central controller 110. Accordingly, in step 419, for a variable timing pattern, the DAQ-BIOS 122 waits until its proper response time associated with the module in which this DAQ-BIOS 122 is operating and then transmits the response message back to the central controller.

Returning attention now back to step 417, if additional data is not available for return to the central controller 110, processing proceeds to step 418.

In step 418, the DAQ-BIOS 122 operating in the module 180 determines if there are other commands can request message 190 to be processed for this module 180. If so, processing proceeds back to step 413 in order to extract the next command from the request message 195 that is applicable to this module 180. In this manner, a single request message 195 can contain multiple commands 145 pricing the module 180 in either a fixed for a variable timing patterns. If the DAQ-BIOS 122 determines that no other commands are present in the request message 195 for this module 180, processing proceeds to step 419 that, as explained above, transmits the response message 195 back to the central controller 110.

In this manner, the DAQ-BIOS 122 operating within each module 180 can process request messages 190 in order to input any data to the devices 118 coupled to the module 180 and also to output any recorded signaling information measured or otherwise obtain from the devices 118 and one or more response message is 195 back to DAQ-BIOS 120 operating within the central controller 110.

Those skilled in the art will understand that there can be many variations made to the embodiments explained above while still achieving the same objective of those embodiments and the invention in general. For example, rearrangement of certain processing steps in the flow charts explained above can be performed by those skilled in the art while still accomplishing the overall functionality of embodiments of the invention. Such variations are intended to be covered by the scope of this invention. As such, the foregoing description of embodiments of the invention is not intended to be limiting. Rather, any limitations to the invention are presented in the following claims.

What is claimed is:

1. In a central controller, a method for performing acquisition of data from a set of modules networked to the central controller, the method comprising the steps of:
   obtaining at least one command to be sent to at least one module of the set of modules networked to the central controller;
   composing a request message containing the at least one command, the request message having an associated timing pattern selected by the central controller from a plurality of available timing patterns;
   transmitting the request message to the at least one module of the set of modules according to the associated timing pattern; and
   receiving, according to the associated timing pattern, a response message from the at least one module of the set of modules.

2. The method of claim 1 wherein the plurality of available timing patterns include:
   i) a fixed timing pattern that shares request and response time between each module during a request response sequence in a time sliced manner; and
   ii) a variable timing pattern that provides a request message to the at least one module that indicates when that module is to respond to the request message and that indicates an amount of return data to be returned from that module in a response message from that module.

3. The method of claim 1 wherein the associated timing pattern is a variable timing pattern and wherein the step of composing a request message comprises the steps of:
   determining a response time for the at least one command, the response time defining when a module to which the at least one command is directed is to respond to the command;
   selecting an amount of return data to be returned in a response message from the module to which the at least one command is directed; and
   assigning the response time and the amount of return data to the at least one command in the request message such that the step of receiving a response message receives the response message from the module to which the at least one command is directed at a receipt time related to the response time and that contains data no greater than the amount of return data assigned to the at least one command.

4. The method of claim 3 wherein:
   the step of obtaining at least one command comprises the step of obtaining at least one respective command for a plurality of respective modules in the set of modules;
   the step of determining a response time for the at least one command comprises the step of determining a respective response time associated with each respective module, each respective response time indicating when the module to which that response time is associated is to respond after processing the at least one command obtained for that module;
   the step of selecting an amount of return data comprises the step of determining a respective amount of return data to be returned from each respective module in response to processing the at least one command;
   the step of composing a request message comprises the steps of combining the at least one command, the respective response time and the respective amount of return data for each of the plurality of respective modules into the request message; and
   the step of transmitting the request message transmits the request message containing at least one respective command for multiple respective modules from the set of modules networked to the central controller.

5. The method of claim 4 wherein the step of combining the at least command for the plurality of respective modules comprises the steps of:
   sequentially inserting each command associated with a respective module into a data portion of the request message;
   inserting a module offset into the data portion, the module offset indicating where in the data portion of the request message the at least one command for a respective module begins in the data portion;
   repeating the steps of sequentially inserting each command and inserting a module offset until all commands for each respective module are inserted into the data portion of the request message and module offsets are inserted into the data portion indicating where the at least one command begins for a particular module of the plurality of modules.

6. The method of claim 4 comprising the step of repeating the step of receiving a response message in order to receive a response message from each module for which at least one respective command was obtained and combined in the request message.

7. The method of claim 6 comprising the steps of:
   repeating the steps of obtaining, composing, transmitting and receiving for a plurality of different modules in the set of modules networked to the central controller such that each repeated step of transmitting transmits a single request message containing commands for different modules, and such that each repeated step of receiving receives a response message from each of the different modules for which the transmitted request message contained at least one command.

8. The method of claim 1 wherein the step of receiving comprises the steps of:
   detecting that the response message indicates that additional data is available from a responding module that originated the response message;
   transmitting a second request message to the responding module, the second request message containing at least one command to retrieve the additional data from the responding module; and
   receiving a second response message from the responding module, the second response message containing the additional data from the responding module.

9. The method of 8 wherein the step of receiving further comprises the step of repeating the steps of detecting, transmitting a second request message and receiving a second response message until the step of detecting indicates that no more additional data is available from the responding module.

10. The method of claim 1 wherein the associated timing pattern is a fixed timing pattern and wherein:
    the step of obtaining at least one command comprises the step of obtaining at least one command for a single module of the set of modules networked to the central controller;
    the step of transmitting the request message comprises the step of transmitting the request message containing the at least one command to the single module during a time slot assigned to that single module; and the step of receiving a response message comprises the step of receiving a response message from the single module during a response time slot assigned to that single module.

11. The method of claim 10 comprising the steps of:
repeating the steps of obtaining, composing, transmitting and receiving for a sequence of different modules in the set of modules networked to the central controller such that in response to each repeated step of transmitting, each of the different modules in the sequence receives a request message containing the at least one command for that module and such that each module processes the at least one command and responds to the at least one command during a time slot assigned to that module.

12. The method of claim 11 wherein a transmit time between repeated steps of transmitting a request message is greater than a response time between successive steps of transmitting and receiving a response message for a single module, such that each module to which a request message is transmitted is capable of providing a complete response message during a time slot assigned to that module prior to a next step of transmitting.

13. The method of claim 11 wherein one of the repeated steps of receiving a response message comprises the step of detecting a network error in at least one of the repeated steps of transmitting and recieving; and
wherein the method comprises the step of, waiting, in response to the step of detecting a network error, for a delay time slot to expire after performing the step of transmitting to a last module in the sequence of different modules before repeating the steps of obtaining, composing, transmitting and receiving, such that a response message can be received from a module effected by the network error.

14. The method of claim 1 wherein the step of obtaining at least one command comprises the steps of:
accessing a channel list to obtain the at least one command, the channel list defining a set of commands to be processed by modules of the set of modules networked to the central controller, each command in the set of commands identifying an associated destination module and defining an associated operation to be performed by the destination module.

15. The method of claim 14 wherein the associated operation defined by at least one command is a read operation to acquire data from the destination module associated with that command.

16. The method of claim 15 wherein the associated operation defined by at least one command is a write operation and wherein the command defines data to be written to the destination modules associated with that command.

17. The method of claim 1 further comprising the step of processing the response message to acquire data related to the at least one module.

18. The method of claim 17 wherein the step of processing the response message comprises the steps of:
obtaining response data from the response message produced as a result of the at least one module processing the at least one command in the request message transmitted to that module; and
providing the response data to at least one of:
i) a user extension routine that is capable of processing the response data; and
ii) chared memory that is capable of storing the response data.

19. The method of claim 1 wherein:
the associated timing pattern is a variable timing pattern;
the step of composing a request message composes a request message containing at least one command applicable to multiple modules in the set of modules; and
the step of transmitting transmits the request message to a multicast address such that each module equipped to receive request messages at the multicast address receives the request message and processes the at least one command contained therein.

20. The method of claim 1 wherein the step of transmitting the request message comprises the steps of:
creating an Ethernet packet containing the request message;
transmitting the Ethernet packet onto a network coupling the central controller and the modules using a non-connection oriented data communications protocol.

21. The method of claim 20 wherein the network coupling the central controller and the modules is a dedicated network and wherein the step of transmitting the Ethernet packet onto the network comprises the step of interfacing directly with a link layer to transmit the Ethernet packet onto the network such modules that receive the Ethernet packet do not require operation of a connection oriented protocol.

22. The method of claim 20 wherein the at least one module networked to the central controller is coupled to a device from which that modules acquires data, and wherein the at least one command transmitted in the request message to the at least one module includes a command to acquire data from the module and wherein the method further comprises the step of repeating the steps of obtaining, composing, transmitting and receiving such that response messages received from modules networked to the central controller return data in real time to the central controller in response to the at least one module processing the at least one command.

23. The method of claim 1 comprising the steps of:
receiving an asynchronous response message from at least one module, the asynchronous response message being received without transmitting a corresponding request message; and
determining if the asynchronous response message is associated with a user extension routine, and if so, passing response data contained in the response message to the user extension routine, and if not, passing the response data to shared memory.

24. In a module networked to a central controller, a method for providing data acquisition to the central controller, the method comprising the steps of:
receiving, a request message containing at least one command, the request message indicating a timing pattern selected by the central controller from a plurality of available timing pattern;
obtaining the at least one command from the request message;
processing the at least one command in the module; and
transmitting a response message to the central controller in response to processing the at least one command, the response message transmitted according to the timing pattern specified by the request message.

25. The method of claim 24 wherein the timing pattern selected by the central controller is a variable timing pattern and wherein the step of receiving comprises the steps of:

interfacing directly with a link layer in the module to receive an Ethernet packet from the network such that the module does not require operation of a connection oriented protocol.

26. The method of claim 24 wherein the timing pattern selected by the central controller is a variable timing pattern and wherein the step of obtaining comprises the steps of:
   obtaining a module offset from a data portion of the request message; and
   traversing command sets in the request message using the offset to locate a command set associated with the module that received the request message.

27. The method of claim 24 wherein the step of processing the at least one command comprises the steps of:
   processing the at least one command in the module using any input data specified in the command;
   retrieving any output data to be returned to the central controller from the module for the at least one command; and
   placing the output data into a response message up to an amount of data assigned for the module as specified within the request message.

28. The method of claim 27 wherein the step of processing the at least one command further comprises the steps of:
   determining if additional data is available for return the to the central controller that cannot fit into the response message, and if so, setting an additional data flag to true in the response message to notify the central controller of additional data available from the module.

29. A central controller comprising:
   a communications interface;
   a memory;
   a processor; and
   an interconnection mechanism coupling the communications interface, the memory and the processor;
   wherein the memory is encoded with a data acquisition basic input output system application that when performed on the processor, produces a data acquisition basic input output system process that causes the computerized device to perform acquisition of data from a set of modules networked to the central controller by performing the operations of:
   obtaining at least one command to be sent to at least one module of the set of modules networked to the central controller via the communications interface;
   composing, in the memory, a request message containing the at least one command, the request message having an associated timing pattern selected by the central controller from a plurality of available timing patterns;
   transmitting the request message, via the communications interface, to the at least one module of the set of modules according to the associated timing pattern; and
   receiving, via the communications interface, according to the associated timing pattern, a response message from the at least one module of the set of modules.

30. The central controller of claim 29 wherein the plurality of available timing patterns include:
   i) a fixed timing pattern that shares request and response time between each module during a request response sequence in a time sliced manner; and
   ii) a variable timing pattern that provides a request message to the at least one module that indicates when that module is to respond to the request message and that indicates an amount of return data to be returned from that module in a response message from that module.

31. A module comprising:
   a communications interface;
   a memory;
   a processor; and
   an interconnection mechanism coupling the communications interface, the memory and the processor;
   wherein the memory is encoded with a data acquisition basic input output system application that when performed on the processor, produces a data acquisition basic input output system process that causes the module to providing data acquisition to a central controller by performing the operations of:
   receiving, via the communications interface, a request message containing at least one command, the request message indicating a timing pattern selected by the central controller from a plurality of available timing patterns;
   obtaining the at least one command from the request message;
   processing, via the processor, the at least one command in the module; and
   transmitting, via the communications interface, a response message to the central controller in response to processing the at least one command, the response message transmitted according to the timing pattern specified by the request message.

32. A computer program product having a computer-readable medium including computer program logic encoded thereon that, when performed in a central controller provides a data acquisition basic input output system that performs acquisition of data from a set of modules networked to the central controller by performing the operations of:
   obtaining at least one command to be sent to at least one module of the set of modules networked to the central controller;
   composing a request message containing the at least one command, the request message having an associated timing pattern selected by the central controller from a plurality of available timing patterns;
   transmitting the request message to the at least one module of the set of modules according to the associated timing pattern; and
   receiving, according to the associated timing pattern, a response message from the at least one module of the set of modules.

33. A computer program product having a computer-readable medium including computer program logic encoded thereon that, when performed in a module provides a data acquisition basic input output system that performs data acquisition to a central controller networked to the module by performing the operations of:
   receiving, a request message containing at least one command, the request message indicating a timing pattern selected by the central controller from a plurality of available timing patterns;
   obtaining the at least one command from the request message;
   processing the at least one command in the module; and
   transmitting a response message to the central controller in response to processing the at least one command, the response message transmitted according to the timing pattern specified by the request message.

* * * * *